(12) United States Patent
Izumikawa

(10) Patent No.: US 11,047,113 B2
(45) Date of Patent: Jun. 29, 2021

(54) SURROUNDINGS MONITORING SYSTEM FOR WORK MACHINE

(71) Applicant: SUMITOMO(S.H.I.) CONSTRUCTION MACHINERY CO., LTD., Tokyo (JP)

(72) Inventor: Takeya Izumikawa, Chiba (JP)

(73) Assignee: SUMITOMO(S.H.I.) CONSTRUCTION MACHINERY CO., LTD., Tokyo (JP)

(*) Notice: Subject to any disclaimer, the term of this patent is extended or adjusted under 35 U.S.C. 154(b) by 0 days.

(21) Appl. No.: 16/363,194

(22) Filed: Mar. 25, 2019

(65) Prior Publication Data

US 2019/0218754 A1 Jul. 18, 2019

Related U.S. Application Data

(63) Continuation of application No. PCT/JP2017/039339, filed on Oct. 31, 2017.

(30) Foreign Application Priority Data

Nov. 1, 2016 (JP) .............................. JP2016-214714

(51) Int. Cl.
*E02F 9/26* (2006.01)
*H04N 7/18* (2006.01)
(Continued)

(52) U.S. Cl.
CPC ............... *E02F 9/261* (2013.01); *B60R 1/00* (2013.01); *B66F 17/003* (2013.01); *E02F 9/24* (2013.01);
(Continued)

(58) Field of Classification Search
CPC . B60R 1/00; B60R 2300/306; B60R 2300/70; B60R 2300/8033; B66F 17/003;
(Continued)

(56) References Cited

U.S. PATENT DOCUMENTS 6,327,522 B1 * 12/2001 Kojima .................. B60K 35/00
701/1
9,836,938 B2 12/2017 Kiyota
(Continued)

FOREIGN PATENT DOCUMENTS

EP 2570556 3/2013
EP 2978213 1/2016
(Continued)

OTHER PUBLICATIONS

International Search Report for PCT/JP2017/039339 dated Jan. 23, 2018.

*Primary Examiner* — Peter D Le
(74) *Attorney, Agent, or Firm* — Ipusa, PLLC

(57) ABSTRACT

A surroundings monitoring system for a work machine includes a display device in a cabin of the work machine, an image capturing unit configured to capture an image of the surroundings of the work machine, and a processor configured to generate a surrounding image of the work machine and to cause a monitoring image to be displayed on the display device. The monitoring image includes a work machine image and the surrounding image placed along the periphery of the work machine image. The processor is configured to cause a magnified monitoring image to be displayed on the display device. The magnified monitoring image magnifies a partial area of the surrounding image in the monitoring image. The partial area is centered on a position closer to a predetermined target object included in the surrounding image than to the work machine image and includes the target object.

14 Claims, 15 Drawing Sheets

(51) Int. Cl.
  *H04N 5/262* (2006.01)
  *E02F 9/24* (2006.01)
  *B60R 1/00* (2006.01)
  *G06K 9/00* (2006.01)
  *B66F 17/00* (2006.01)

(52) U.S. Cl.
  CPC ..... *G06K 9/00369* (2013.01); *G06K 9/00805* (2013.01); *H04N 5/2628* (2013.01); *H04N 7/18* (2013.01); *H04N 7/183* (2013.01); *B60R 2300/306* (2013.01); *B60R 2300/70* (2013.01); *B60R 2300/8033* (2013.01)

(58) Field of Classification Search
  CPC ........ E02F 9/24; E02F 9/261; G06K 9/00369; G06K 9/00805; H04N 5/2628; H04N 7/18; H04N 7/183
  See application file for complete search history.

(56) References Cited

U.S. PATENT DOCUMENTS

| | | | | |
|---|---|---|---|---|
| 2003/0160863 A1* | 8/2003 | Kakou | ............ | G08B 13/19602 348/46 |
| 2003/0193562 A1* | 10/2003 | Corzillus | ............... | H04N 7/181 348/148 |
| 2007/0206835 A1* | 9/2007 | Abe | ............... | H04N 7/181 382/104 |
| 2007/0242855 A1* | 10/2007 | Chen | ............... | G02B 23/14 382/103 |
| 2009/0251334 A1* | 10/2009 | Yoshihashi | ........ | B62D 15/0285 340/932.2 |
| 2009/0259400 A1* | 10/2009 | Coats | ............... | G08G 1/166 701/301 |
| 2010/0134325 A1* | 6/2010 | Gomi | ............... | G03B 37/04 340/995.14 |
| 2011/0026771 A1* | 2/2011 | Hsu | ............... | G06K 9/00805 382/104 |
| 2011/0234802 A1* | 9/2011 | Yamada | ............... | G03B 15/02 348/148 |
| 2013/0088593 A1 | 4/2013 | Ishimoto | | |
| 2014/0375814 A1* | 12/2014 | Ishimoto | ............... | E02F 9/24 348/148 |
| 2015/0138356 A1* | 5/2015 | Kowatari | ............... | H04N 7/181 348/144 |
| 2015/0138360 A1* | 5/2015 | Kowatari | ............... | B60R 1/00 348/148 |
| 2015/0199576 A1* | 7/2015 | Ichikawa | ............... | E01C 23/163 382/104 |
| 2015/0203034 A1* | 7/2015 | Ishimoto | ............... | H04N 7/181 348/148 |
| 2016/0006947 A1* | 1/2016 | Kowatari | ............... | H04N 5/44 348/148 |
| 2016/0151653 A1* | 6/2016 | Ge | ............... | A62C 3/00 169/46 |
| 2016/0205319 A1* | 7/2016 | Oota | ............... | E02F 9/261 348/38 |
| 2016/0301863 A1* | 10/2016 | Petrany | ............... | H04N 5/247 |
| 2017/0016210 A1* | 1/2017 | Kowatari | ............... | G06T 3/4038 |
| 2017/0284069 A1* | 10/2017 | Machida | ............... | H04N 5/225 |

FOREIGN PATENT DOCUMENTS

| | | |
|---|---|---|
| JP | 2011-162993 | 8/2011 |
| JP | 2012-082608 | 4/2012 |
| JP | 5395266 | 1/2014 |
| JP | 2014-181508 | 9/2014 |
| JP | 2014-183497 | 9/2014 |
| JP | 2014-183500 | 9/2014 |
| JP | 2015-184839 | 10/2015 |

* cited by examiner

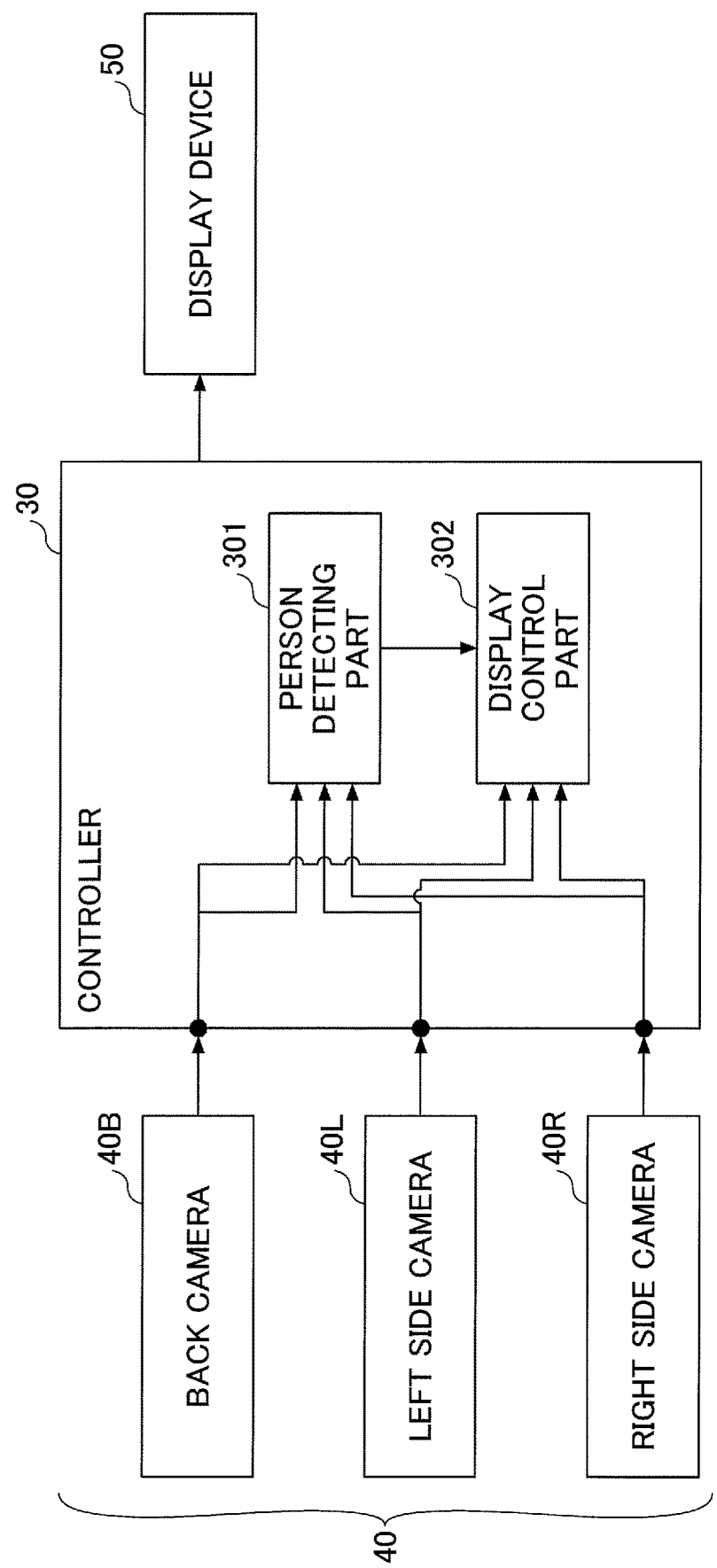

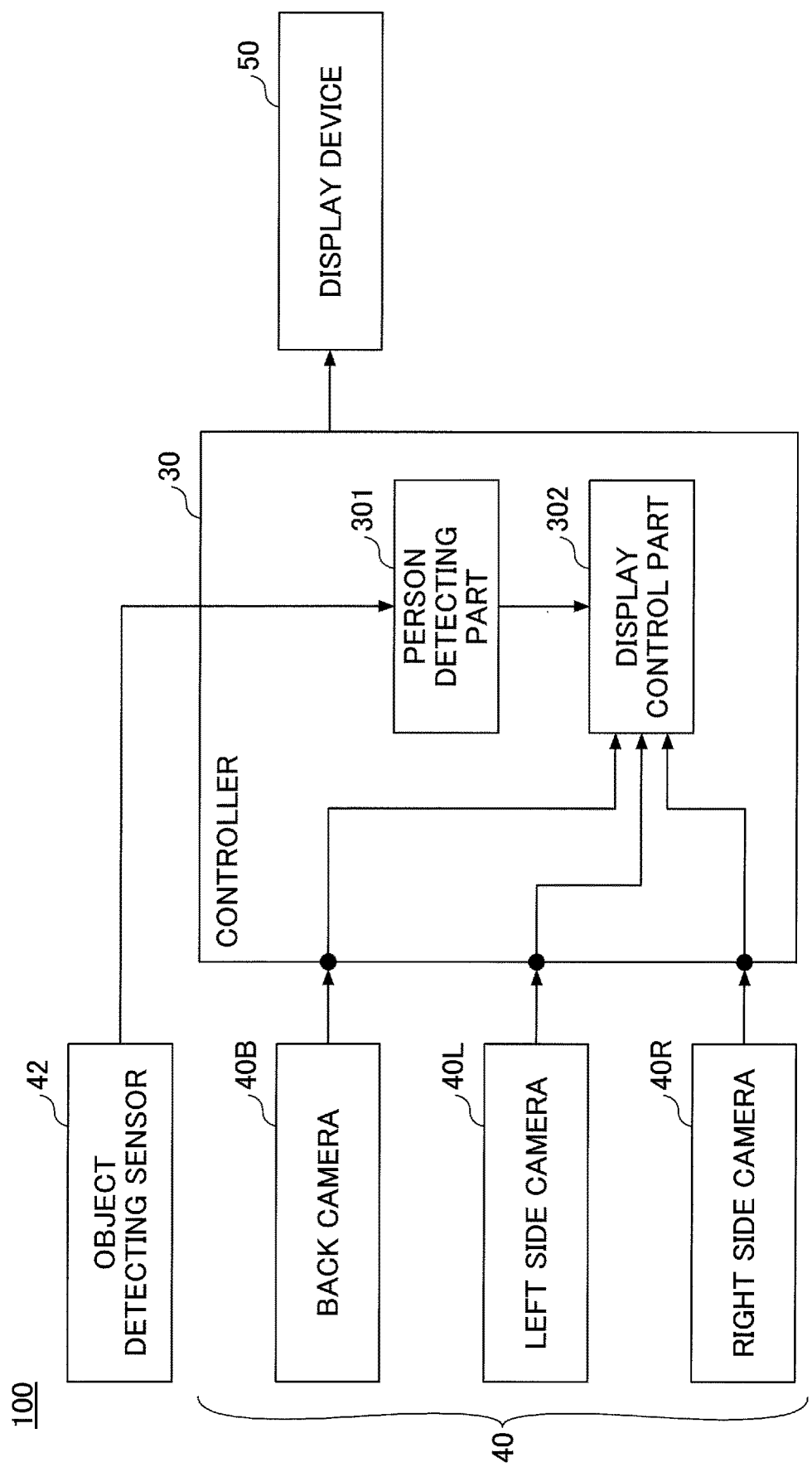

SURROUNDINGS MONITORING SYSTEM FOR WORK MACHINE

CROSS-REFERENCE TO RELATED APPLICATIONS

This application is a continuation application filed under 35 U.S.C. 111(a) claiming benefit under 35 U.S.C. 120 and 365(c) of PCT International Application No. PCT/JP2017/039339, filed on Oct. 31, 2017 and designating the U.S., which claims priority to Japanese patent application No. 2016-214714, filed on Nov. 1, 2016. The entire contents of the foregoing applications are incorporated herein by reference.

BACKGROUND

Technical Field

The present invention relates to surroundings monitoring systems for work machines.

Description of Related Art

A surroundings monitoring device that displays, on a monitor around an operator seat, a monitoring image (for example, an overhead view image looking at a work machine from directly above) generated based on an image captured by an image capturing device (a camera) attached to a work machine to capture an image of its surroundings is known.

According to this surroundings monitoring device, when a person is detected within a predetermined area around a work machine, a monitoring image is displayed, being magnified from wide area display to nearby display.

SUMMARY

According to an aspect of the present invention, a surroundings monitoring system for a work machine includes a display device in a cabin of the work machine, an image capturing unit configured to capture an image of the surroundings of the work machine, and a processor configured to generate a surrounding image of the work machine and to cause a monitoring image to be displayed on the display device. The monitoring image includes a work machine image and the surrounding image placed along the periphery of the work machine image. The processor is configured to cause a magnified monitoring image to be displayed on the display device. The magnified monitoring image magnifies a partial area of the surrounding image in the monitoring image. The partial area is centered on a position closer to a predetermined target object included in the surrounding image than to the work machine image and includes the target object.

BRIEF DESCRIPTION OF THE DRAWINGS

FIG. 2A is a diagram illustrating a configuration of the surroundings monitoring system according to the embodiment;

FIG. 2B is a diagram illustrating another configuration of the surroundings monitoring system according to the embodiment;

DETAILED DESCRIPTION

According to the related-art surroundings monitoring device as described above, however, the monitoring image is simply magnified from wide area display to nearby display around an image that is a schematic representation of a work machine as a center. Therefore, it may be impossible for an operator to instantaneously understand the condition of a detected person displayed around the image simulating a work machine at the center of the monitoring image.

According to an aspect of the present invention, it is possible to provide a surroundings monitoring system for work machines that, when a person is detected around a work machine, can cause an operator to have a faster understanding of the condition of the detected person.

An embodiment of the present invention is described with reference to the drawings.

[Configuration of Work Machine]

First, a work machine in which a surroundings monitoring system 100 (see FIGS. 2A and 2B) according to this embodiment is installed is described with reference to FIG. 1.

Figure 1:
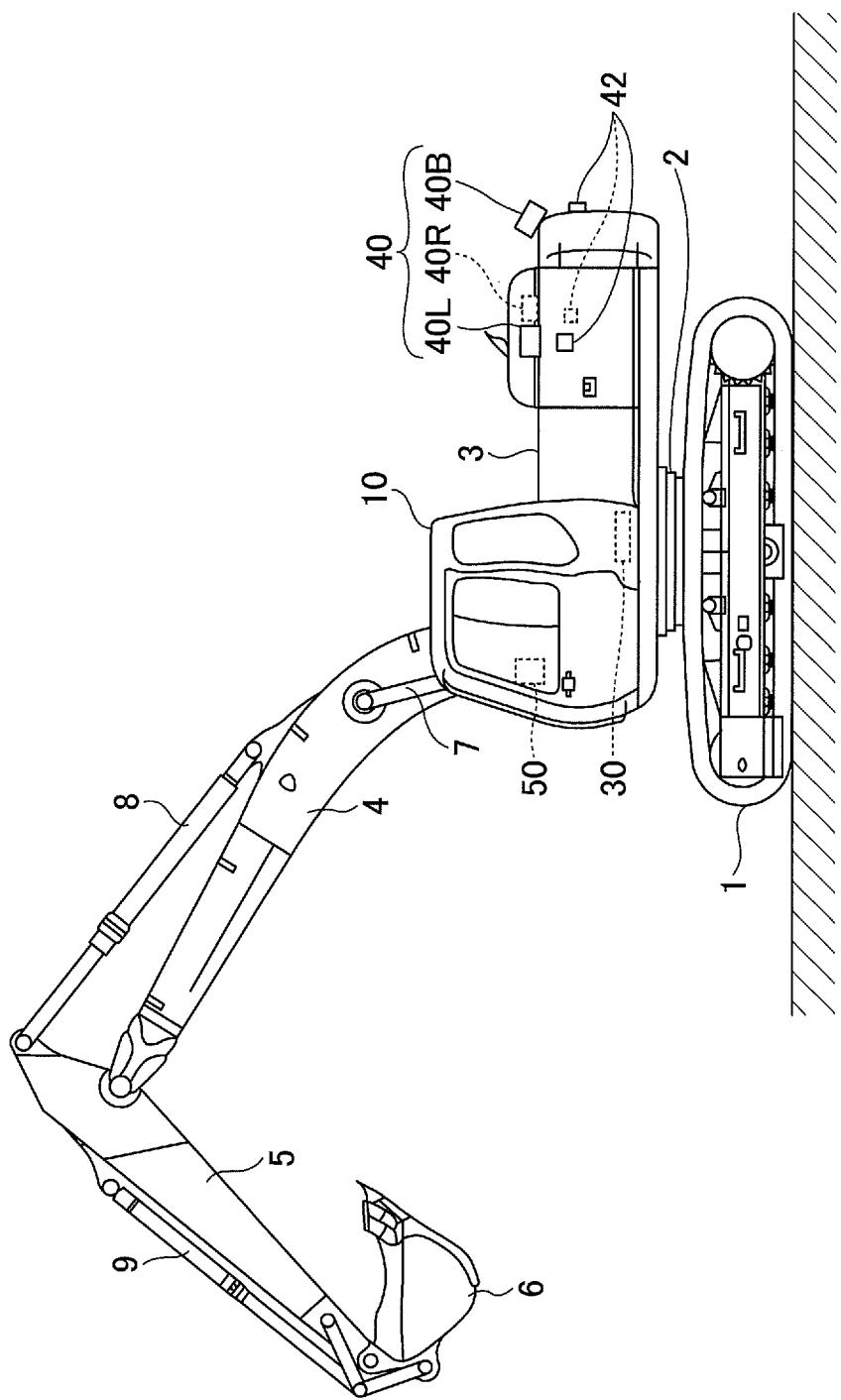
FIG. 1 is a diagram illustrating an example of a work machine in which a surroundings monitoring system according to an embodiment is installed.

FIG. 1 is a diagram illustrating an example of a work machine in which the surroundings monitoring system 100 according to this embodiment is installed, and is specifically a side view of a shovel.

Needless to say, the surroundings monitoring system 100 according to this embodiment may also be installed in work machines other than a shovel, such as a wheel loader and an asphalt finisher.

The shovel according to this embodiment includes a lower traveling body 1; an upper turning body 3 turnably mounted on the lower traveling body 1 via a turning mechanism 2; a boom 4, an arm 5, and a bucket 6 serving as a work device; and a cabin 10 for an operator to ride in.

The lower traveling body 1 includes, for example, a pair of left and right crawlers, each of which is hydraulically driven by a traveling hydraulic motor (not depicted) to cause the shovel to travel.

The upper turning body 3 is driven by a turning hydraulic motor or an electric motor (neither of which is depicted) to turn relative to the lower traveling body 1.

The boom 4 is pivotally attached to the center front of the upper turning body 3 in such a manner as to be able to lower and rise. The arm 5 is pivotally attached to the end of the boom 4 in such a manner as to be pivotable upward and downward. The bucket 6 is pivotally attached to the end of the arm 5 in such a manner as to be pivotable upward and downward. The boom 4, the arm 5, and the bucket 6 are hydraulically driven by a boom cylinder 7, an arm cylinder 8, and a bucket cylinder 9, respectively.

The cabin 10 is an operator room in which the operator rides, and is mounted on the front left of the upper turning body 3.

Furthermore, the shovel according to this embodiment includes a controller 30, an image capturing unit 40, object detecting sensors 42, and a display device 50.

The controller 30 is a control device that controls the driving of the shovel. The controller 30 is installed in the cabin 10.

The image capturing unit 40 is attached to the top of the upper turning body 3 to capture an image of the surroundings of the shovel. The image capturing unit 40 includes a back camera 40B, a left side camera 40L, and a right side camera 40R.

The back camera 40B is attached to the top of the back end of the upper turning body 3 to capture an image of an area behind the upper turning body 3.

The left side camera 40L is attached to the top of the left end of the upper turning body 3 to capture an image of an area to the left of the upper turning body 3.

The right side camera 40R is attached to the top of the right end of the upper turning body 3 to capture an image of an area to the right of the upper turning body 3.

The object detecting sensors 42 are attached to outside surfaces of the upper turning body 3 to detect objects (obstacles) around, specifically, at the back, to the left, and to the right of the shovel. Objects that can be detected by the object detecting sensors 42 may include a person. Specifically, the object detecting sensors 42 may include a sensor that detects an object at the back of the upper turning body 3, a sensor that detects an object to the left of the upper turning body 3, and a sensor that detects an object to the right of the upper turning body 3. Examples of the object detecting sensors 42 may include an ultrasonic sensor, a millimeter wave sensor, and LIDAR (Light Detection and Ranging) that can detect an object by outputting detection waves or laser light to the surroundings of the shovel (the upper turning body 3) and receiving the reflected waves or reflected light. The object detecting sensors 42 can determine whether a detected object is a person or an object other than a person based on the intensity of reflected waves or reflected light, for example. The object detecting sensors 42 may alternatively be stereo cameras, for example.

The display device 50 is provided around an operator seat in the cabin 10, and displays various kinds of image information of which the operator is notified under the control of the controller 30 (a display control part 302 as described below).

[Configuration of Surroundings Monitoring System]

Next, configurations of the surroundings monitoring system 100 is described with reference to FIGS. 2A and 2B.

FIG. 2A is a block diagram illustrating a configuration of the surroundings monitoring system 100 according to this embodiment.

The surroundings monitoring system 100 according to this embodiment includes the controller 30, the image capturing unit 40, and the display device 50.

The controller 30 executes main control processing in the surroundings monitoring system 100. The functions of the controller 30 may be implemented by any hardware, any software, or their combination, and is composed mainly of a microcomputer including a CPU, a RAM, a ROM, and an I/O, for example. The controller 30 includes a person detecting part 301 and the display control part 302 as function parts that are implemented by running various programs stored in the ROM on the CPU.

As described above, the image capturing unit 40 includes the back camera 40B, the left side camera 40L, and the right side camera 40R. The back camera 40B, the left side camera 40L, and the right side camera 40R are attached to the top of the upper turning body 3 such that their optical axes point obliquely downward, and have respective vertical imaging ranges (angles of view) covering the ground near the shovel to an area far from the shovel. While the shovel is in operation, the back camera 40B, the left side camera 40L, and the right side camera 40R output captured images to the controller 30 at regular intervals (for example, every ¹/₃₀ seconds), and the captured images are fed into the controller 30.

While the shovel is in operation, the object detecting sensors 42 output the results of detection around the upper turning body 3 (specifically, on the back side, the left side, and the right side of the upper turning body 3) to the controller 30 at regular intervals, and the results of detection are fed into the controller 30.

The display device 50 displays a captured image (a through-the-lens image) of the image capturing unit 40, a surrounding image that the controller 30 (the image control part 302) generates based on a captured image of the image capturing unit 40 (for example, a viewpoint transformed image as described below), etc.

The person detecting part 301 detects a person within a predetermined area around the shovel, for example, within a predetermined distance D1 (for example, five meters) from the shovel, based on a captured image captured by the image capturing unit 40. For example, the person detecting part 301 can recognize a person within a captured image and determine the actual position of the recognized person (such as a distance D from the shovel to the recognized person) by applying various known image processing techniques, machine learning-based classifiers, etc., as desired.

As illustrated in FIG. 2B (a block diagram illustrating another configuration of the surroundings monitoring system 100 according to this embodiment), the person detecting part 301 may detect a person within a predetermined area around the shovel based on the detection results of the object detecting sensors 42. In this case, the person detecting part 301 can determine whether a detected object is a person or not based on a characteristic included in the detection results of the object detecting sensors 42, such as the pattern or intensity of reflected waves or reflected light. Furthermore, the person detecting part 301 may also detect a person that is a monitoring target based on both a captured image captured by the image capturing unit 40 and the results of detection by the object detecting sensors 42 through so-called sensor fusion.

The display control part 302 causes various information images to be displayed on the display device 50. For example, the display control part 302 generates a surrounding image based on a captured image of the image capturing unit 40, and causes the surrounding image to be displayed on the display device 50. Specifically, the display control part 302 generates, as a surrounding image, a viewpoint transformed image (an image as viewed from a virtual viewpoint) by executing known viewing transformation based on captured images of the back camera 40B, the left side camera 40L, and the right side camera 40R, and causes the viewpoint transformed image to be displayed on the display device 50. Furthermore, when causing a surrounding image to be displayed on the display device 50, the display control part 302 causes a shovel image (an example of a work machine image) schematically representing the shovel to be displayed together on the display device 50 in order to specify the relative positional relationship of the imaging range of the image capturing unit 40 shown in the surrounding image with the shovel. That is, the display control part 302 generates a monitoring image including the shovel image and the surrounding image, placed along the periphery of the shovel image in accordance with the relative positional relationship between the shovel and the imaging range of the image capturing unit 40, and causes the monitoring image to be displayed on the display device 50. A monitoring image displayed on the display device 50, together with the details of the display device 50, is described below with reference to FIG. 3.

Figure 3:
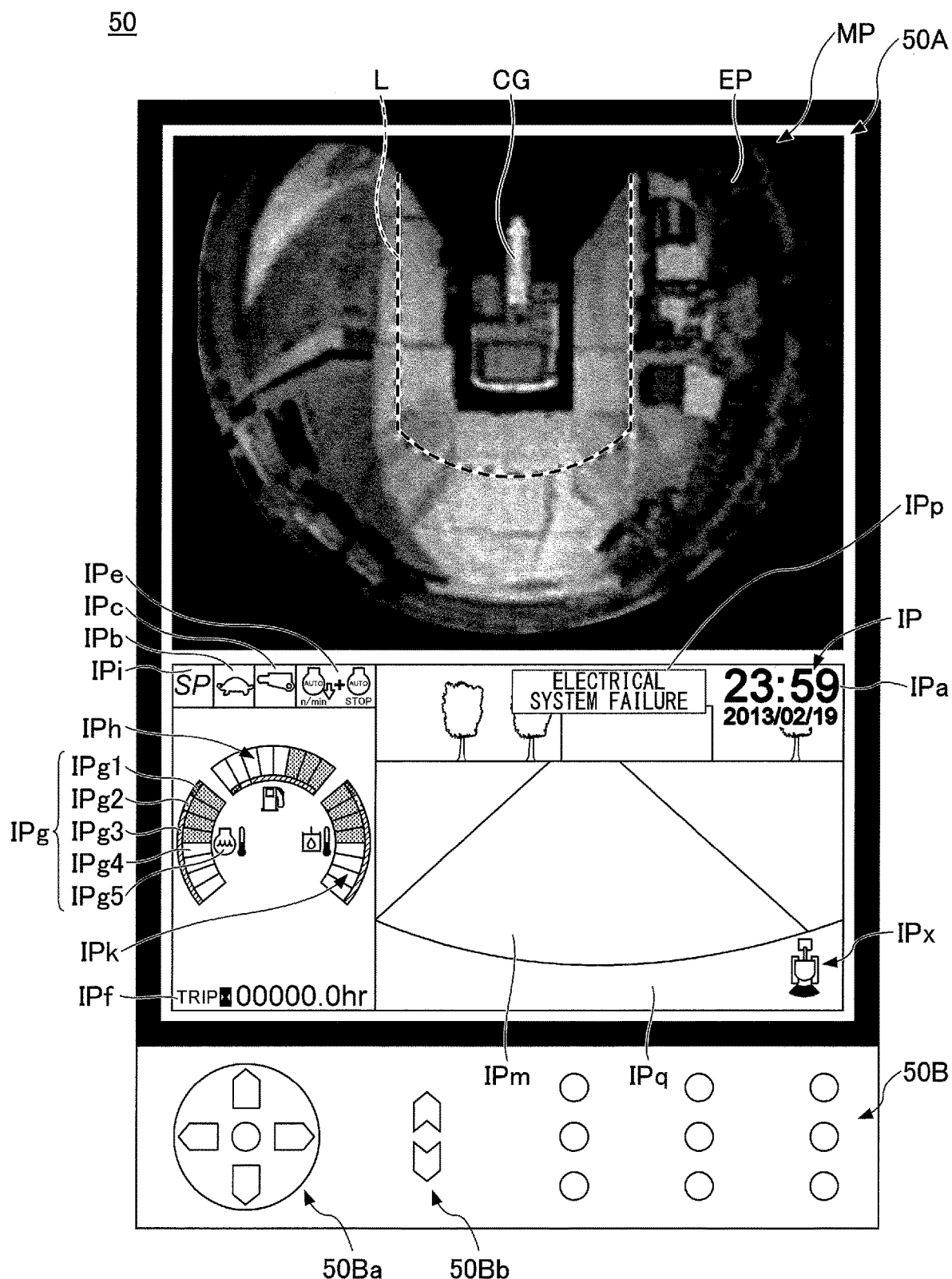
FIG. 3 is a diagram illustrating an example of a monitoring image displayed on a display device.

FIG. 3 is a diagram illustrating an example of a monitoring image displayed on the display device 50.

As illustrated in FIG. 3, the display device 50 includes a display part 50A where various information images are displayed and an operation part 50B of hardware for operating operation targets displayed in various information images (such as an operation button icon and a cursor).

According to this example, not only a monitoring image MP but also an operating information image IP presenting various kinds of information related to the operation of the shovel is displayed in the display part 50A. Specifically, the monitoring image MP is displayed in the upper half of the display part 50A and the operating information image IP is displayed in the lower half of the display part 50A.

The operating information image IP includes a date and time display area IPa, a traveling mode display area IPb, an end attachment display area IPc, an engine control status display area IPe, an engine operating time display area IPf, a coolant water temperature display area IPg, a remaining fuel amount display area IPh, a rotational speed mode display area IPi, a hydraulic oil temperature display area IPk, a camera image display area IPm, an alarm display area IPp, and an orientation indicator icon IPx.

The date and time display area IPa is an area for displaying a current date and time. According to this example, digital display is employed to show that the date is Feb. 19, 2013 and the time is 23:59.

The traveling mode display area IPb is an area for displaying an image for a current traveling mode. The traveling mode represents the setting of traveling hydraulic motors using a variable displacement pump. Specifically, the traveling mode includes a low-speed mode and a high-speed mode. A "turtle"-shaped mark is displayed for the low-speed mode, and a "rabbit"-shaped mark is displayed for the high-speed mode. According to this example, the "turtle"-shaped mark is displayed to make it possible for the operator to recognize that the low-speed mode is set.

The end attachment display area IPc is an area for displaying an image representing a currently attached end attachment. End attachments attachable to the shovel include various end attachments such as a rock drill, a grapple, and a lifting magnet in addition to the bucket 6. The end attachment display area IPc displays, for example, marks shaped like these end attachments. According to this example, a rock drill-shaped mark is displayed to make it possible for the operator to recognize that a rock drill is attached as an end attachment.

The engine control status display area IPe is an area for displaying an image for the status of control of an engine. According to this example, the operator can recognize that "automatic deceleration and automatic stop mode" is selected as the status of control of the engine. The "automatic deceleration and automatic stop mode" means the status of control to automatically reduce the engine rotational speed and further to automatically stop the engine in accordance with the duration of the low-load state of the engine. Other statuses of control of the engine include "automatic deceleration mode," "automatic stop mode," and "manual deceleration mode."

The engine operating time display area IPf is an area for displaying an image for the cumulative operating time of the engine. According to this example, a value using a unit "hr (hour)" is displayed.

The coolant water temperature display area IPg is an area for displaying an image for the current temperature condition of engine coolant water. According to this example, a bar graph that represents the temperature condition of the engine coolant water is displayed. The temperature of the engine coolant water is displayed based on the output data of a water temperature sensor attached to the engine.

Specifically, the coolant water temperature display area IPg includes an abnormal range indicator IPg1, a caution range indicator IPg2, a normal range indicator IPg3, a segment indicator IPg4, and an icon indicator IPg5.

The abnormal range indicator IPg1, the caution range indicator IPg2, and the normal range indicator IPg3 are indicators for notifying the operator that the temperature of the engine coolant water is abnormally high, requires attention, and is normal, respectively. The segment indicator IPg4 is an indicator for notifying the operator of the level of the temperature of the engine coolant water. The icon indicator IPg5 is an icon, such as a graphic symbol, indicating that the abnormal range indicator IPg1, the caution range indicator IPg2, the normal range indicator IPg3, and the segment indicator IPg4 are indicators pertaining to the temperature of the engine coolant water.

The icon indicator IPg5 may alternatively be character information indicating that the indicators are related to the temperature of the engine coolant water.

According to this example, the segment indicator IPg4 is composed of eight segments that are individually controlled to light up or darken, and the number of lighted segments increases as the coolant water temperature increases. According to this example, four segments are lighted. The segment indicator IPg4 is so displayed as to form part (an arc) of a predetermined circle, such that the length of the arc increases or decreases as the temperature of the engine coolant water increases or decreases. While the temperatures represented by the individual segments are equal in width according to this example, the width of temperatures may differ from segment to segment.

Furthermore, according to this example, the abnormal range indicator IPg1, the caution range indicator IPg2, and the normal range indicator IPg3 are arc-shaped graphics successively arranged along a direction in which the segment indicator IPg4 extends or shrinks (a circumferential direction of the predetermined circle), and are displayed in red, yellow, and green, respectively. According to the segment indicator IPg4, the first (lowest) through sixth segments belong to the normal range, the seventh segment belongs to the caution range, and the eighth (highest) segment belongs to the abnormal range.

Instead of displaying the abnormal range indicator IPg1, the caution range indicator IPg2, and the normal range indicator IPg3 in arc-shaped graphics, the coolant water temperature display area IPg may display characters, symbols, etc., indicating an abnormal level, a caution level, and a normal level at their respective boundaries.

The above-described configuration including an abnormal range indicator, a caution range indicator, a normal range indicator, a segment indicator, and an icon indicator may likewise be adopted also for the remaining fuel amount display area IPh and the hydraulic oil temperature display area IPk. Instead of displaying arc-shaped graphics representing an abnormal range, a caution range, and a normal range, the remaining fuel amount display area IPh may display a letter "F" or a black circle (a circle filled with black), indicating "Full (filled-up state)", a letter "E" or a white circle (an unfilled circle), indicating "Empty (empty state)", etc., at their respective boundaries.

The remaining fuel amount display area IPh is an area for displaying an image for the state of the remaining amount of fuel stored in a fuel tank. According to this example, a bar graph representing the current state of the remaining amount of fuel is displayed. The remaining amount of fuel in the remaining fuel amount display area IPh is displayed based on the output data of a remaining fuel amount sensor in the fuel tank.

The rotational speed mode display area IPi is an area for displaying a current rotational speed mode. The rotational speed mode includes, for example, the four modes of SP mode, H mode, A mode, and idling mode. According to this example, a symbol "SP" representing SP mode is displayed.

The hydraulic oil temperature display area IPk is an area for displaying an image for the temperature condition of hydraulic oil in a hydraulic oil tank. According to this example, a bar graph indicating the temperature condition of hydraulic oil is displayed. The temperature of hydraulic oil in the hydraulic oil temperature display area IPk is displayed based on the output data of an oil temperature sensor in the hydraulic oil tank.

The coolant water temperature display area IPg, the remaining fuel amount display area IPh, and the hydraulic oil temperature display area IPk may adopt needle display in lieu of bar graph display.

The camera image display area IPm is an area for directly displaying a captured image (a through-the-lens image) of at least one of the back camera 40B, the left side camera 40L, and the right side camera 40R. This makes it possible for the operator to view a captured image (a through-the-lens image) captured by the image capturing unit 40 directly within the operating information image IP, in addition to the monitoring image MP.

For example, while the shovel is in operation, a captured image captured by the back camera 40B may be constantly displayed in the camera image display area IPm. In this case, the captured image (the through-the-lens image) of the image capturing unit 40 in the camera image display area IPm is desirably displayed as a mirror image.

Furthermore, according to this example, the camera image display area IPm occupies an area of approximately two thirds on the right side of the operating information image IP. This is for increasing overall visibility by displaying the remaining fuel amount display area IPh, etc., closer to the operator seat (operator) and displaying the camera image display area IPm farther from the operator seat (operator) in an environment where the display device 50 is installed on the front right of the operator seat. The size and layout of display areas in the operating information image IP, however, may be changed as needed.

Furthermore, with respect to a captured image displayed in the camera image display area IPm, the image capturing unit 40 that captures a captured image to display may be switched or the captured image may be enlarged or reduced in size, in accordance with a touch operation on the touchscreen display part 50A or an operation on the operation part 50B. For example, the operator may be able to switch the image capturing unit 40 (the back camera 40B, the left side camera 40L, or the right side camera 40R) that captures a captured image (a through-the-lens image) to be displayed in the camera image display area IPm by performing the operation of specifying a left or right direction with a directional pad 50Ba of the operation part 50B. Furthermore, the operator may be able to zoom in on and zoom out of a captured image by pressing a button specifying an upward direction and a button specifying a downward direction, respectively, of scaling buttons 50Bb. In this case, the operator may touch any position in the camera image display area IPm on the touchscreen display part 50A to specify the position, and zoom in or out around the specified position at the center. Furthermore, the operator may be able to move a cursor with the directional pad 50Ba and zoom in or out around the cursor position at the center.

The alarm display area IPp is an area for displaying an alarm. According to this example, a warning message indicating the occurrence of failure in an electrical system is displayed over a through-the-lens image. Furthermore, according to this example, when a lever operation is performed with no captured image captured by the back camera 40B being displayed in the camera image display area IPm, an alarm giving a warning to that effect is displayed in the alarm display area IPp. When there is no alarm to be displayed, a through-the-lens image is displayed as is in the alarm display area IPp.

The orientation indicator icon IPx is an icon that represents the relative relationship between the orientation of the image capturing unit 40 that has captured a captured image (a through-the-lens image) that is displayed in the operating information image IP and the orientation of the shovel (the attachment of the upper turning body 3). According to this example, the orientation indicator icon IPx indicating that the image capturing unit 40 that captures a camera image displayed in the camera image display area IPm is the back camera 40B is displayed in the lower right corner of the camera image display area IPm.

The orientation indicator icon IPx may alternatively be displayed at a position other than the lower right corner, such as the lower center, the lower left corner, the upper right corner, or the upper left corner, of the camera image display area IPm, or be displayed outside the camera image display area IPm.

The operating information image IP may exclude one or more of the above-described display areas IPa through IPk or may include a display area other than those described above. For example, the operating information image IP may include an exhaust gas filter condition display area for displaying the degree of clogging of an exhaust gas filter (for example, a diesel particulate filter [DPF]). Specifically, the exhaust gas filter condition display area may display a bar graph that represents the ratio of the current usage time of the exhaust gas filter to its maximum allowable usage time.

Furthermore, the operating information image IP may exclude the display of the temperature condition of hydraulic oil or may exclude the display of the temperature condition of hydraulic oil and the temperature condition of coolant water.

Furthermore, the camera image display area IPm includes, at its bottom, a cover image IPq serving as a vehicle body image that is an image of the upper edge of the back end of the cover of the upper turning body 3. Because of this, the operator has a better sense of distance between an object displayed in the camera image display area IPm and the shovel. Furthermore, according to this embodiment, the orientation indicator icon IPx is displayed over the cover image IPq in order to keep the same background color of the orientation indicator icon IPx to increase its visibility and also to prevent the orientation indicator icon IPx from hiding part of a camera image that is desired to be seen. The orientation indicator icon IPx may be displayed outside the camera image display area IPm.

Furthermore, as illustrated in FIG. 3, the monitoring image MP including a shovel image CG and a surrounding image EP placed along the periphery of the shovel image CG is displayed in the upper-half laterally elongated rectangular area (for example, a screen of an aspect ratio of 4:3) of the display part 50A of the display device 50 as described above. This makes it possible for the operator to appropriately understand the positional relationship between an object including a person shown in the surrounding image EP and the shovel.

The surrounding image EP according to this example is a viewpoint transformed image that is a combination of a road surface image looking at the surroundings of the shovel from directly above and a horizontal image looking horizontally at the surroundings of the shovel and placed along the periphery of the road surface image. A surrounding image (a viewpoint transformed image) is obtained by projecting respective captured images of the back camera 40B, the left side camera 40L, and the right side camera 40R onto a space model and re-projecting the projected images projected onto the space model onto a different two-dimensional plane. The space model is an object onto which a captured image is projected in a virtual space, and is composed of one or more plane surfaces or curved surfaces that include a plane surface or a curved surface different from a plane surface in which the captured image is positioned. Hereinafter, a description is given based on the assumption that a surrounding image according to this embodiment is a viewpoint transformed image that is a combination of the road surface image and the horizontal image.

A line segment L that represents positions where the distance D from the shovel is constant may be displayed over the monitoring image MP. For example, the line segment L represents positions of a predetermined distance D2 that is a distance from the shovel smaller than the predetermined distance D1. As a result, when an object including a person is shown in the surrounding image EP, it is possible to understand how far it is positioned from the shovel.

Furthermore, the same as the above-described camera image display area IPm of the operating information image IP, the monitoring image MP may be enlarged or reduced in accordance with a touch operation on the touchscreen display part 50A or an operation on the operation part 50B. For example, the operator may be able to zoom in on and zoom out of the monitoring image EP by pressing a button specifying an upward direction and a button specifying a downward direction, respectively, of the scaling buttons 50Bb. In this case, the operator may touch any position in the monitoring image EP on the touchscreen display part 50A to specify the position, and zoom in or out around the specified position at the center. Furthermore, the operator may be able to move a cursor with the directional pad 50Ba and zoom in or out around the cursor position at the center.

[Overview of Display Mode of Monitoring Image]

Next, a characteristic function of the display control part 302 is described.

When the person detecting part 301 detects a person within a predetermined area around the shovel, the display control part 302 changes the display mode of a monitoring image so that the detected person is easily viewable by the operator. Specifically, when the person detecting part 301 detects a person within a predetermined area around the shovel, the display control part 302 changes the display mode of a monitoring image to one that stresses (emphasizes) the position of the detected person compared with other positions within the monitoring image.

For example, when the person detecting part 301 detects a person within a predetermined area around the shovel, the display control part 302 generates a magnified image of a partial area of a surrounding image that includes the detected person (hereinafter referred to as "magnified monitoring image"), and causes the magnified image to be displayed on the display device 50. Hereinafter, to distinguish from the magnified monitoring image, a monitoring image in the case where no person is detected within a predetermined area around the shovel by the person detecting part 301 (see FIG. 3) is referred to as "normal monitoring image." For example, the display control part 302 generates a magnified monitoring image magnifying a partial area of a surrounding image in a normal monitoring image, centered on a position closer to a detected person included in the surrounding image than to a shovel image and including the person. Furthermore, for example, the display control part 302 generates a magnified monitoring image magnifying the shovel image as well together with the partial area of the surrounding image. By thus magnifying a partial area of a monitoring image which is placed to be centered on a position close to a detected person and includes the position of the detected person, the display control part 302 can cause the monitoring image of a display mode that stresses the position of a detected person compared with other positions to be displayed on the display device 50.

The display control part 302 may generate a magnified monitoring image by clipping and magnifying a partial area of a normal monitoring image. Furthermore, the display control part 302 may also generate a magnified monitoring image by generating a surrounding image (a viewpoint transformed image) corresponding to the partial area based on a captured image of the image capturing unit 40 and combining the surrounding image with a shovel image.

Furthermore, according to this example, the display control part 302 may change the specifications of a change in the display mode of a monitoring image in accordance with the distance D between a person detected by the person detecting part 301 and the shovel. For example, the display control part 302 may increase the magnification ratio of a magnified monitoring image to a normal monitoring image as the distance D between a person detected by the person detecting part 301 and the shovel decreases. Specifically, when the distance D between a person detected within a predetermined area around the shovel by the person detecting part 301 and the shovel is less than or equal to the predetermined distance D2 (where D1>D2), the display control part 302 may cause the ratio of magnification to be higher than in the case where the distance D is not less than or equal to the predetermined distance D2. As a result, when the detected person is relatively close to the shovel, the operator can easily understand the condition of the detected person and can reliably secure the safety of the detected person. On the other hand, when the detected person is relatively remote from the shovel, because a greater area of the surrounding image can be included in the magnified monitoring image, it is possible to understand the condition of the detected person while understanding the condition of the entirety of the surroundings of the shovel, so that it is easy to take subsequent safety actions.

According to this example, the display control part 302 magnifies a partial area of a monitoring image that includes a detected person. The display control part 302, however, may alternatively simply change the placement of a normal monitoring image on a screen such that a position close to the detected person in the normal monitoring image is at the center of the screen. Furthermore, according to this example, when switching the display contents of the display device 50 between a normal monitoring image and a magnified monitoring image, the display control part 302 may directly switch from an image before switching to an image after switching or may sequentially change an image before switching into an image after switching, using a technique such as morphing.

The magnified monitoring image is described in detail below (see FIGS. 4A through 7B).

Furthermore, for example, when the person detecting part 301 detects a person within a predetermined area around the shovel, the display control part 302 generates a monitoring image including a surrounding image of the surroundings of the shovel viewed from a virtual viewpoint from which the detected person is easily viewable, and causes the monitoring image to be displayed on the display device 50. That is, when the person detecting part 301 detects a person within a predetermined area around the shovel, the display control part 302 generates a monitoring image including a viewpoint transformed image (a surrounding image) viewed from a virtual viewpoint different from that of a normal monitoring image, based on a captured image of the image capturing unit 40, and causes the monitoring image to be displayed on the display device 50. Specifically, the display control part 302 may generate a monitoring image that includes a shovel image as viewed from the same virtual viewpoint and a surrounding image placed along the periphery of the shovel image in accordance with the relative positional relationship between the shovel and the imaging range of the image capturing unit 40. Hereinafter, to distinguish from a normal monitoring image, this monitoring image is referred to as "different viewpoint monitoring image."

The different viewpoint monitoring image is described in detail below (see FIG. 8).

Furthermore, for example, when the person detecting part 301 detects a person within a predetermined area around the shovel, the display control part 302 may generate a different viewpoint monitoring image corresponding to a partial area of a surrounding image of a normal monitoring image in which the person is included (hereinafter referred to as "partial different viewpoint monitoring image"), and cause the different viewpoint monitoring image to be displayed on the display device 50. In this case, the partial different viewpoint monitoring image may include a surrounding image including the detected person and at least part of a shovel image placed with a size and a positional relationship commensurate with the surrounding image.

The partial different viewpoint monitoring image is described in detail below (see FIG. 9).

The function of changing the display mode of a monitoring image when the person detecting part 301 detects a person within a predetermined area around the shovel may be turned on and off by the operator's operation. For example, the operator may turn on and off the function with operations on a software operation target (a predetermined icon button or the like) displayed on the touchscreen display part 50A or on the hardware operation part 50B of the display device 50 as described above.

[Details of Display Mode of Monitoring Image]

The change of the display mode of a monitoring image displayed on the display device 50 is described in detail below with reference to FIGS. 4A through 9.

Figure 4A:
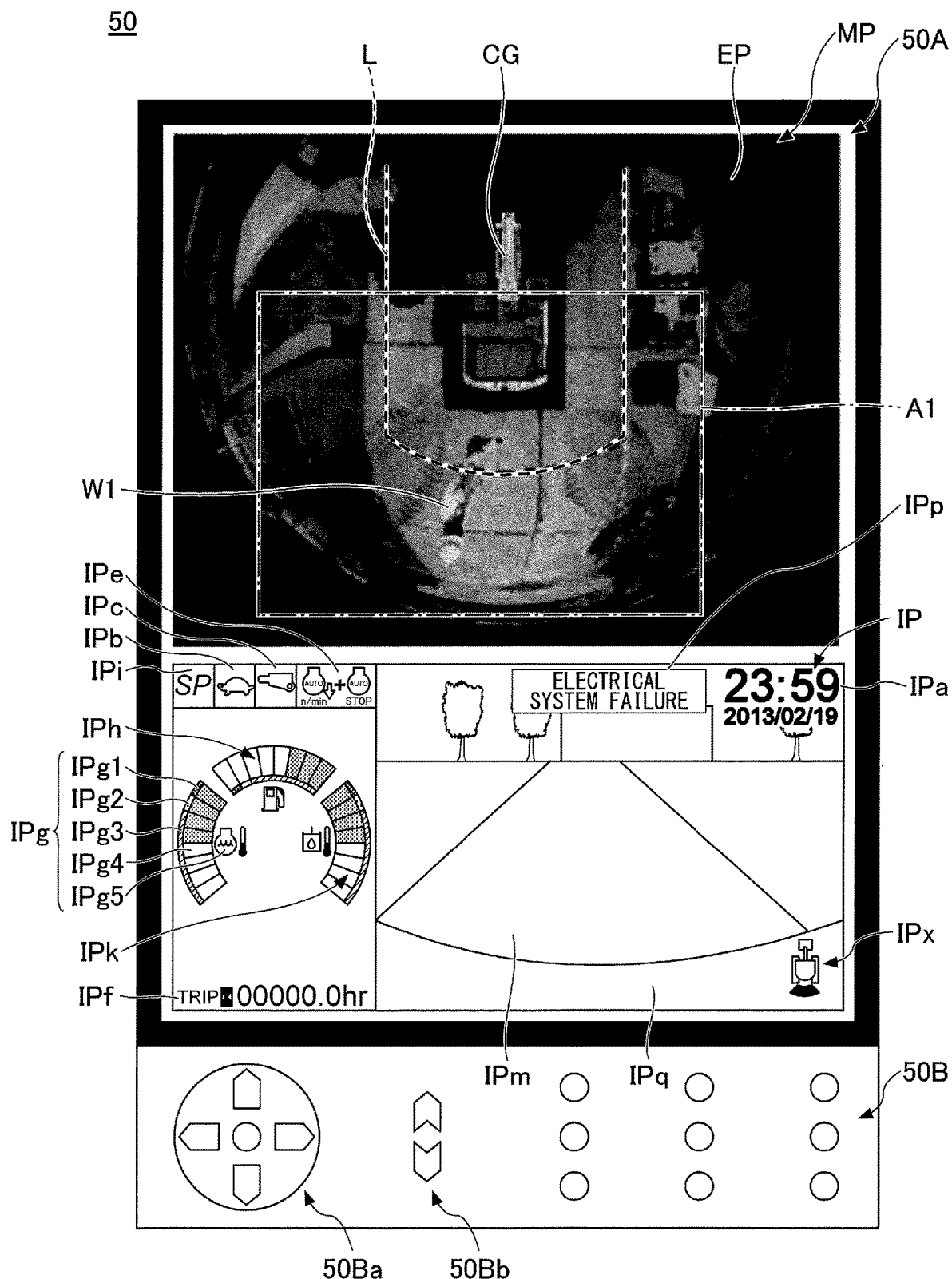
FIG. 4A is a diagram illustrating a first example magnified monitoring image displayed on the display device.
Figure 4B:
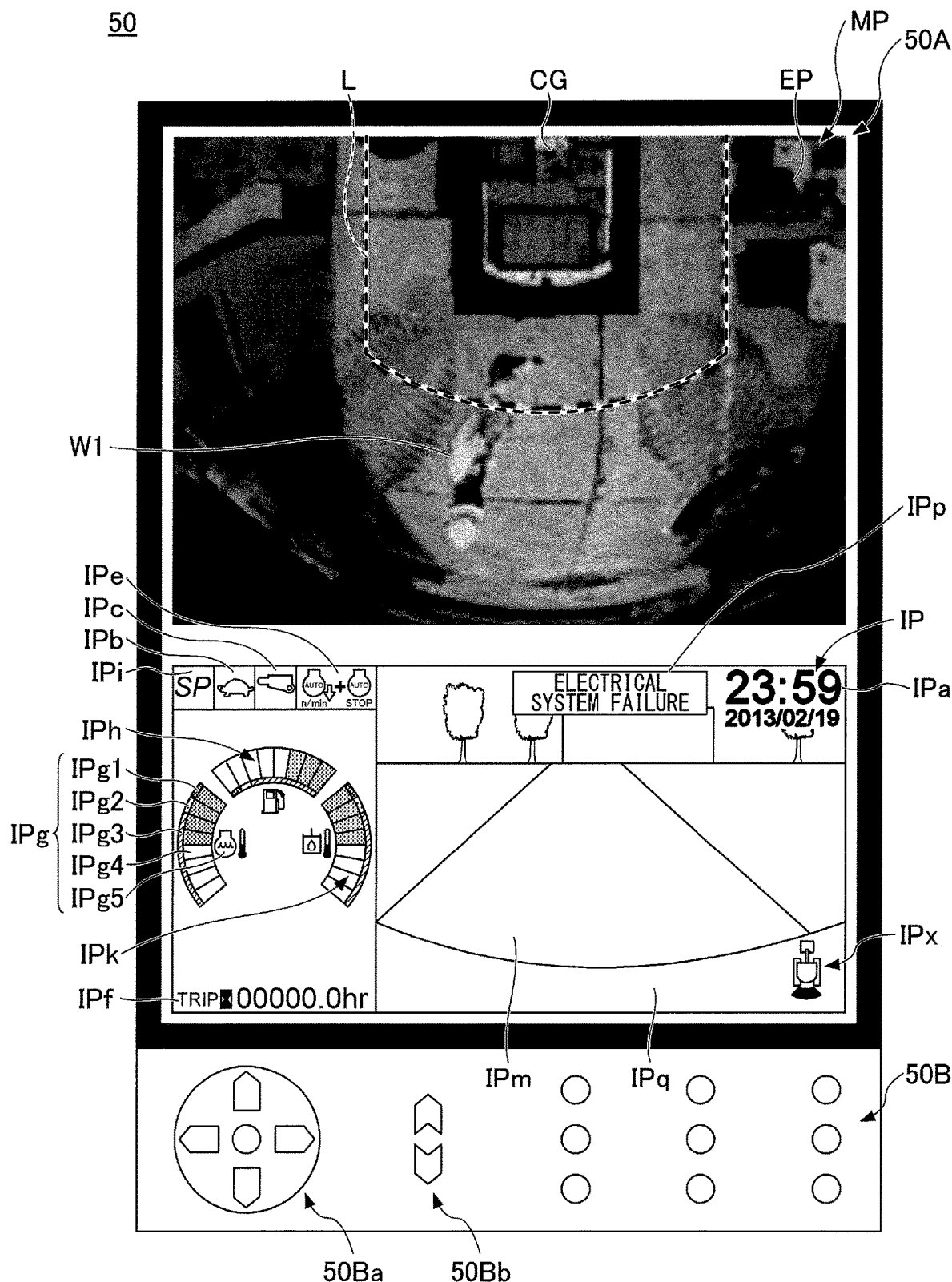
FIG. 4B is a diagram illustrating the first example magnified monitoring image displayed on the display device.

First, FIGS. 4A and 4B are diagrams illustrating a first example magnified monitoring image displayed on the display device 50. Specifically, FIG. 4A is a normal monitoring image displayed on the display device 50, and FIG. 4B is the first example magnified monitoring image displayed on the display device 50 as a result of detection of a person by the person detecting part 301.

As illustrated in FIG. 4A, in the surrounding image EP of the monitoring image MP (normal monitoring image), a worker W1 is shown at a position closer to the shovel than the line segment L behind the shovel, that is, in an area within the predetermined distance D2 from the shovel behind the shovel. In this situation, the person detecting part 301 reports detection of a person to the display control part 302 in response to detecting the worker W1. In response to this, the display control part 302 changes the display mode of a monitoring image as described above.

Specifically, as illustrated in FIG. 4B, the display control part 302 generates the monitoring image MP (magnified monitoring image) magnifying a partial area A1 (see FIG. 4A) of the surrounding image EP including the worker W1, centered on a position closer to the worker W1 included in the surrounding image EP than to the shovel image CG (according to this example, the position of the worker W1) in the monitoring image MP (normal monitoring image) of FIG. 4A, and causes the monitoring image MP to be displayed on the display device 50. Furthermore, according to this example, the display control part 302 generates a magnified monitoring image magnifying the shovel image CG as well with the same magnification ratio as the partial area A1 of the surrounding image EP. That is, the display control part 302 generates a magnified monitoring image magnifying the partial area A1, centered on the position of the worker W1 in a normal monitoring image, and causes the magnified monitoring image to be displayed on the display device 50.

At the substantial center of the magnified monitoring image displayed on the display device 50 according to this example, the worker W1 is positioned. Therefore, when the person detecting part 301 detects a person (the worker W1) within a predetermined area around the shovel, the operator can easily understand what action the detected person (worker W1) is taking by looking at the display contents (magnified monitoring image) of the display device 50. Therefore, it is possible to increase safety during the operator's shovel operation. Furthermore, according to this example, at least part of a shovel image is included in a magnified monitoring image. Therefore, it is possible to understand the relative positional relationship between a person detected by the person detecting part 301 (the worker W1) and the shovel with ease. Furthermore, according to this example, compared with a normal monitoring image, a magnified monitoring image includes a shovel image magnified with the same magnification ratio as a surrounding image. Therefore, it is possible to understand the relative positional relationship between a person detected by the person detecting part 301 (the worker W1) and the shovel with more accuracy.

The specifications of the change of a display mode from a normal monitoring image to a magnified monitoring image may be suitably adjusted by the operator's operation using the touchscreen display part 50A or the hardware operation part 50B of the display device 50 to the extent that the center of the magnified monitoring image is closer to a detected person than to the shovel image. For example, the operator may adjust setting values such as a magnification ratio and the amount of offset of the center of a magnified monitoring image from the shovel image CG (the amount of offset in the X-axis direction and the Y-axis direction in the display part 50A) by operating the touchscreen display part 50A or the operation part 50B. Furthermore, for example, with a normal monitoring image being displayed in the display part 50A, the operator may set the center position and the magnification ratio of a magnified monitoring image by performing a predetermined confirming operation after magnifying the normal monitoring image centered on a desired position with a desired magnification ratio by operating the touchscreen display part 50A or the operation part 50B, and may set multiple sets of specifications one for each of areas (at the back, to the left, and to the right) in which a person is detected. Furthermore, for example, with a magnified monitoring image being displayed in the display part 50A, the operator may suitably adjust the area of the surrounding image EP included in the magnified monitoring image to the extent that a detected person is included by operating the touchscreen display part 50A or the operation part 50B. As a result, the surroundings monitoring system 100 can display a magnified monitoring image that suits the operator's taste on the display device 50. The same applies to the cases of FIGS. 5A through 7B and 9 below.

Figure 5A:
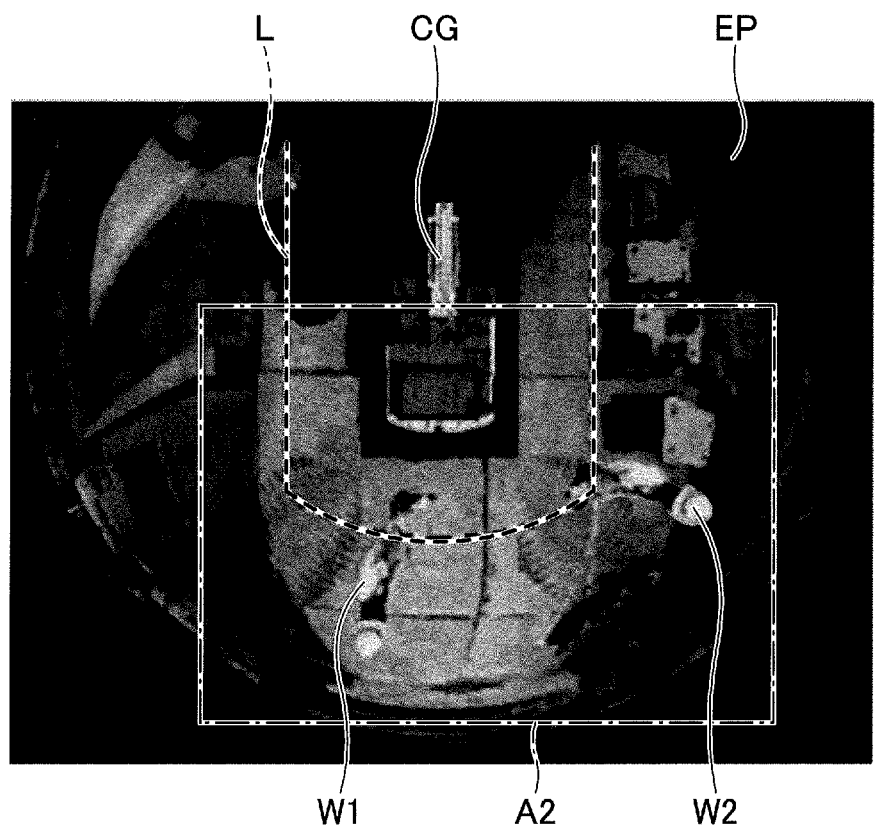
FIG. 5A is a diagram illustrating a second example magnified monitoring image displayed on the display device.
Figure 5B:
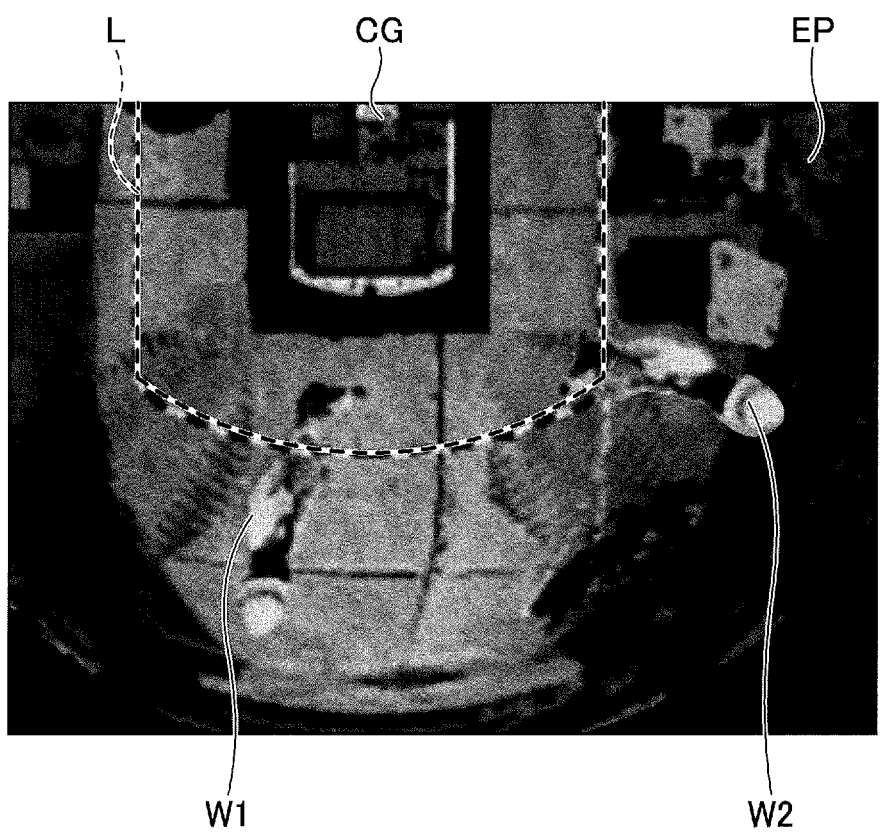
FIG. 5B is a diagram illustrating the second example magnified monitoring image displayed on the display device.

Next, FIGS. 5A and 5B are diagrams illustrating a second example magnified monitoring image displayed on the display device 50. Specifically, FIG. 5A is a normal monitoring image displayed on the display device 50, and FIG. 5B is the second example magnified monitoring image displayed on the display device 50 as a result of detection of a person by the person detecting part 301.

In FIGS. 5A and 5B, while the display part 50A, the operation part 50B, etc., of the display device 50 shown in FIGS. 4A and 4B are omitted, monitoring images (a normal monitoring image and a magnified monitoring image) may be displayed together with the operating information image IP in the display part 50A of the display device 50 the same as in the cases of FIGS. 3, 4A and 4B. The same applies to the cases of FIGS. 6A through 9 below.

As illustrated in FIG. 5A, in the surrounding image in the normal monitoring image, the worker W1 is shown at a position closer to the shovel than is the line segment L behind the shovel, that is, within the predetermined distance D2 from the shovel behind the shovel. Furthermore, in the surrounding image in the normal monitoring image, a worker W2 is shown near the line segment L beside the back right of the shovel, namely, in an area near the predetermined distance D2 from the shovel beside the back of the shovel. In this situation, in response to detecting the workers W1 and W2, the person detecting part 301 reports detection of a person to the display control part 302. In response to this, the display control part 302 changes the display mode of a monitoring image as described above.

Specifically, as illustrated in FIG. 5B, the display control part 302 generates a magnified monitoring image magnifying a partial area A2 of the surrounding image EP including the workers W1 and W2 (see FIG. 5A), centered on a position closer to the workers W1 and W2 included in the surrounding image EP than to the shovel image CG in the normal monitoring image (according to this example, the position of the substantial centroid of a figure defined by the positions of the workers W1 and W2, namely, the position of the substantial midpoint of a line segment connecting the positions of the workers W1 and W2), and causes the magnified monitoring image to be displayed on the display device 50. Furthermore, according to this example, the display control part 302 generates a magnified monitoring image magnifying the shovel image CG as well with the same magnification ratio as the partial area A2 of the surrounding image EP the same as in the first example. That is, the display control part 302 generates a magnified monitoring image magnifying the partial area A2 as is, centered on the position of the substantial midpoint of a line segment connecting the positions of the workers W1 and W2 in the normal monitoring image, and causes the magnified monitoring image to be displayed on the display device 50.

When two or more persons detected by the person detecting part 301 (the workers W1 and W2) are closer to the back of the shovel or positioned close to each other, the workers W1 and W2 included in a magnified monitoring image displayed on the display device 50 are positioned closer to the center than the shovel image. Therefore, when the person detecting part 301 detects two or more persons (the workers W1 and W2) within a predetermined area around the shovel, the operator can easily identify the detected persons (workers W1 and W2) placed closer to the center from the display contents (magnified monitoring image) of the display device 50. Furthermore, the operator can easily understand what actions the detected persons (workers W1 and W2) are taking. Furthermore, according to this example, a magnified monitoring image is so generated as to include all of the detected two or more persons (workers W1 and W2). Therefore, it is possible to understand all actions of the detected two or more persons. Furthermore, according to this example, at least part of the shovel image is included in a magnified monitoring image the same as in the first example. Therefore, it is possible to understand the relative positional relationship between persons detected by the person detecting part 301 (the workers W1 and W2) and the shovel with ease. Furthermore, according to this example, compared with a normal monitoring image, a magnified monitoring image includes a shovel image magnified with the same magnification ratio as a surrounding image the same as in the first example. Therefore, it is possible to understand the relative positional relationship between persons detected by the person detecting part 301 (the workers W1 and W2) and the shovel with more accuracy.

According to this example, the display control part 302 generates a magnified monitoring image magnifying the partial area A2 of the surrounding image EP including the workers W1 and W2 (see FIG. 5A), centered on the position of the substantial centroid of a figure defined by the positions of the workers W1 and W2, but is not limited to this configuration. That is, the magnified monitoring image (the partial area A2) may be centered on a position closer to the position of the substantial centroid of a figure defined by the positions of the workers W1 and W2 than to the shovel image CG.

Figure 6A:
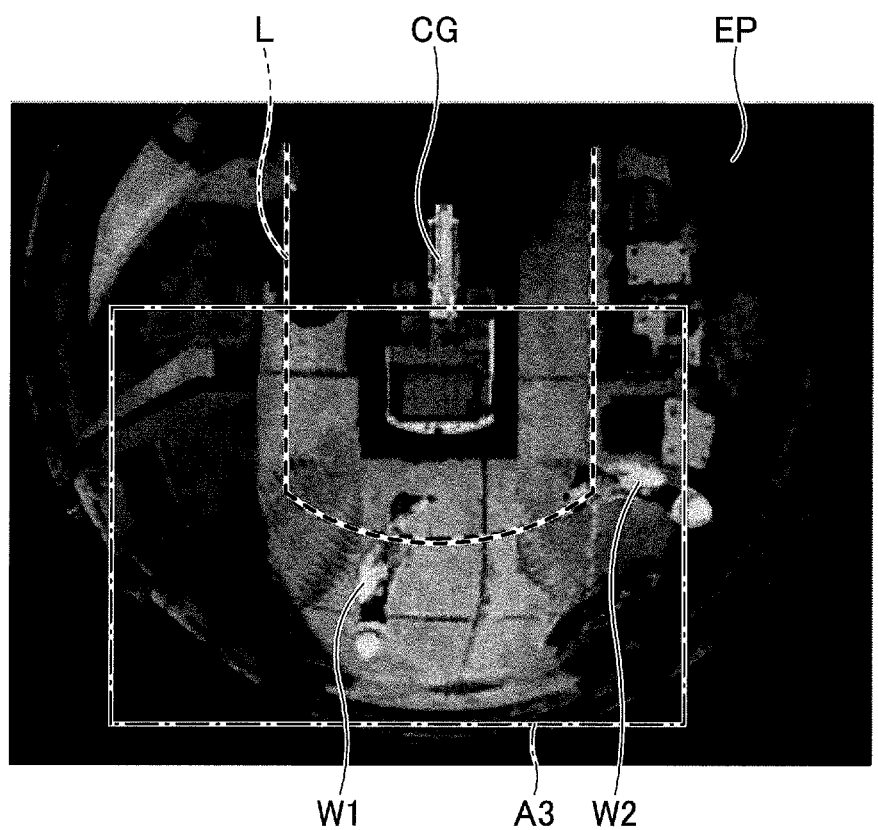
FIG. 6A is a diagram illustrating a third example magnified monitoring image displayed on the display device.
Figure 6B:
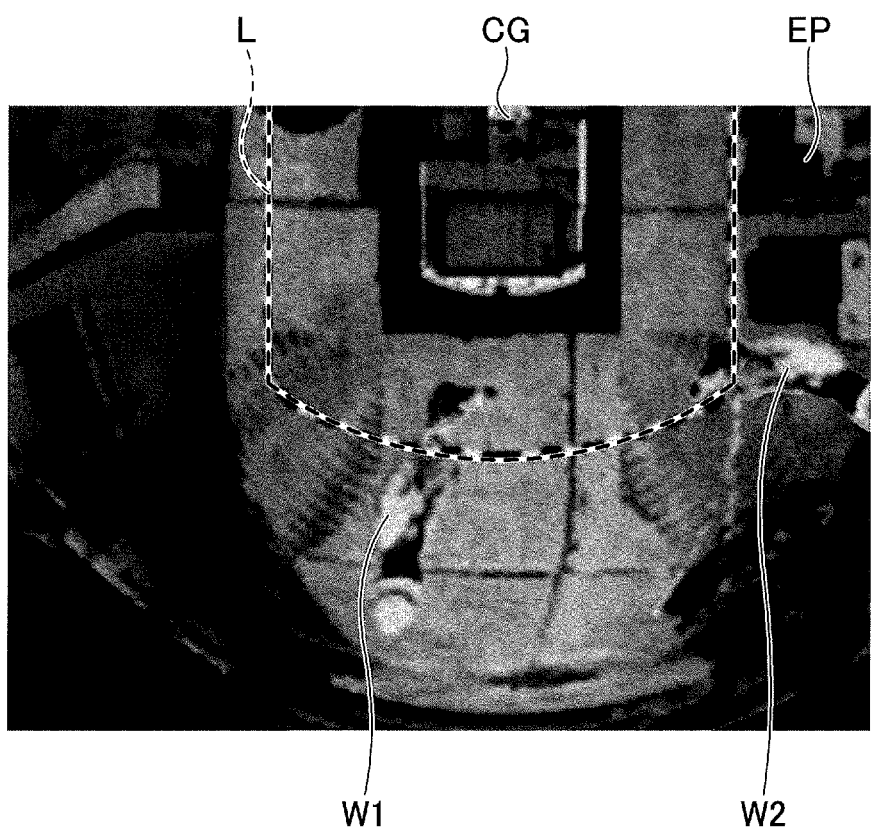
FIG. 6B is a diagram illustrating the third example magnified monitoring image displayed on the display device.

Next, FIGS. 6A and 6B are diagrams illustrating a third example magnified monitoring image displayed on the display device 50. Specifically, FIG. 6A is a normal monitoring image displayed on the display device 50, and FIG. 6B is the third example magnified monitoring image displayed on the display device 50 as a result of detection of a person by the person detecting part 301.

FIG. 6A is the same as FIG. 5A except for the placement of a part bounded by a one-dot chain line (a partial area A3). Therefore, the following description focuses on differences from FIG. 5A.

As illustrated in FIG. 6A, the workers W1 and W2 are shown within a predetermined area around the shovel in a normal monitoring image the same as in FIG. 5A. In this situation, in response to detecting the workers W1 and W2, the person detecting part 301 reports detection of a person to the display control part 302. In response to this, the display control part 302 changes the display mode of a monitoring image as described above.

Specifically, as illustrated in FIG. 6B, the display control part 302 generates a magnified monitoring image magnifying the partial area A3 of the surrounding image EP including the workers W1 and W2 (see FIG. 6A), centered on a position closer to the workers W1 and W2 included in the surrounding image EP than to the shovel image CG in the normal monitoring image (according to this example, the worker W1 closer to the shovel of the workers W1 and W2), and causes the magnified monitoring image to be displayed on the display device 50. Furthermore, according to this example, the display control part 302 generates a magnified monitoring image magnifying the shovel image CG as well with the same magnification ratio as the partial area A3 of the surrounding image EP the same as in the first example. That is, the display control part 302 generates a magnified monitoring image magnifying the partial area A3 as is, centered on the position of the worker W1 in the normal monitoring image, and causes the magnified monitoring image to be displayed on the display device 50.

At the substantial center of the magnified monitoring image displayed on the display device 50 according to this example, the worker W1 who is the closer/closest to the shovel of two or more persons detected by the person detecting part 301 (the workers W1 and W2) is positioned. Therefore, when the person detecting part 301 detects two or more persons (the workers W1 and W2) within a predetermined area around the shovel, the operator can easily recognize the person closer/closest to the shovel (worker W1) of the detected two or more persons (workers W1 and W2) by checking the display contents (magnified monitoring image) of the display device 50. Furthermore, the operator can easily understand what action the person closer/closest to the shovel (worker W1) is taking. Furthermore, according to this example, a magnified monitoring image is so generated as to include all of the detected two or more persons the same as in the second example. Therefore, it is possible to understand all actions of the detected two or more persons. Furthermore, according to this example, at least part of the shovel image is included in a magnified monitoring image the same as in the first example. Therefore, it is possible to understand the relative positional relationship between persons detected by the person detecting part 301 (the workers W1 and W2) and the shovel with ease. Furthermore, according to this example, compared with a normal monitoring image, a magnified monitoring image includes a shovel image magnified with the same magnification ratio as a surrounding image the same as in the first example. Therefore, it is possible to understand the relative positional relationship between persons detected by the person detecting part 301 (the workers W1 and W2) and the shovel with more accuracy.

Figure 7A:
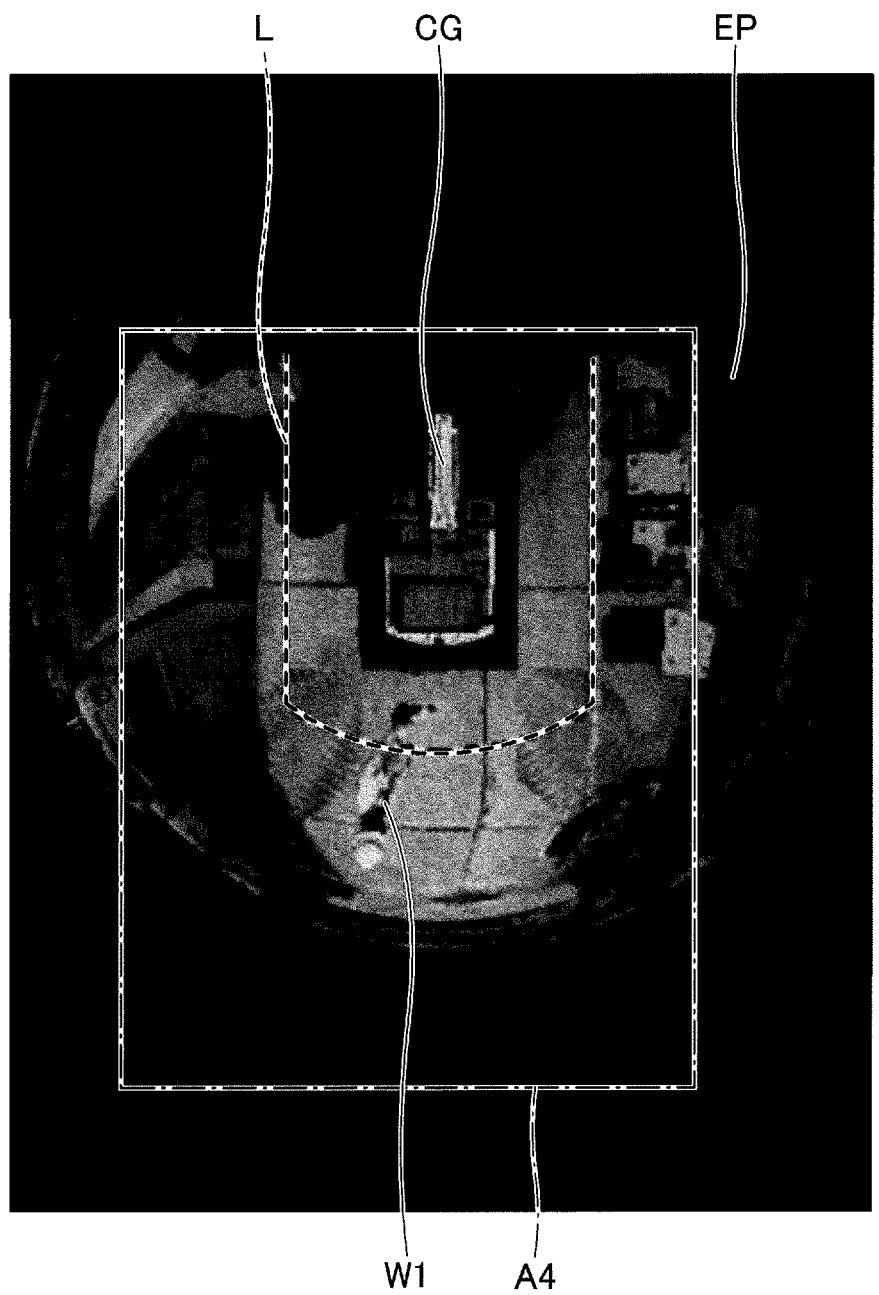
FIG. 7A is a diagram illustrating a fourth example magnified monitoring image displayed on the display device.
Figure 7B:
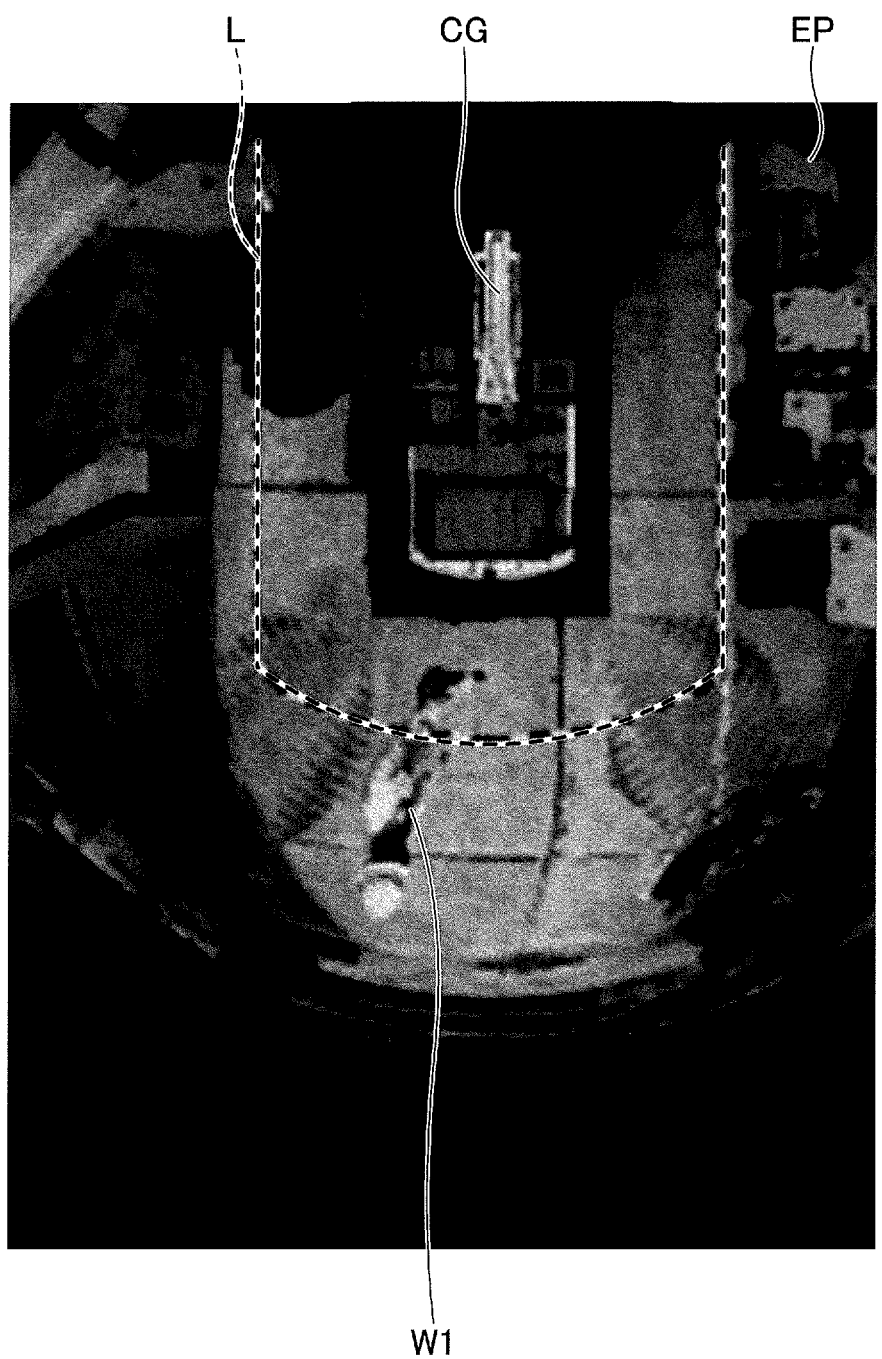
FIG. 7B is a diagram illustrating the fourth example magnified monitoring image displayed on the display device.

Next, FIGS. 7A and 7B are diagrams illustrating a fourth example magnified monitoring image displayed on the display device 50. Specifically, FIG. 7A is a normal monitoring image displayed on the display device 50, and FIG. 7B is the fourth example magnified monitoring image displayed on the display device 50 as a result of detection of a person by the person detecting part 301.

According to this example, as illustrated in FIGS. 7A and 7B, the display device 50 has a vertically elongated rectangular screen (for example, a screen of an aspect ratio of 9:16). FIG. 7A is the same as FIG. 4A except for the vertically elongated rectangular screen of the display device 50 and the placement of a part bounded by a one-dot chain line (a partial area A4). Therefore, the following description focuses on differences from FIG. 4A.

As illustrated in FIG. 7A, the worker W1 within a predetermined area around (behind) the shovel is shown in the surrounding image in the normal monitoring image the same as in FIG. 4A. In this situation, in response to detecting the worker W1, the person detecting part 301 reports detection of a person to the display control part 302. In response to this, the display control part 302 changes the display mode of a monitoring image as described above.

Specifically, as illustrated in FIG. 7B, the display control part 302 generates a magnified monitoring image magnifying the partial area A4 of the surrounding image EP including the worker W1, centered on a position closer to the worker W1 included in the surrounding image EP than to the shovel image CG (according to this example, the position of the worker W1) in the normal monitoring image, and causes the magnified monitoring image to be displayed on the display device 50. Furthermore, according to this example, the display control part 302 generates a magnified monitoring image magnifying the partial area A4 (see FIG. 7A) of the surrounding image EP, including the entirety of a nearby area closer to the shovel (shovel image) than the line segment L, namely, a nearby area within the predetermined distance D2 from the shovel. Furthermore, according to this example, the display control part 302 generates a magnified monitoring image magnifying the shovel image CG as well with the same magnification ratio as the partial area A4 of the surrounding image EP. That is, the display control part 302 generates a magnified monitoring image magnifying the partial area A4 as is, centered on the position of the worker W1 in the normal monitoring image and including the entirety of the nearby area within the predetermined distance D2 from the shovel in the surrounding image EP, and causes the magnified monitoring image to be displayed on the display device 50.

At the substantial center of the magnified monitoring image displayed on the display device 50 according to this example, the worker W1 is positioned the same as in the first example. Therefore, when the person detecting part 301 detects a person (the worker W1) within a predetermined area around the shovel, the operator can easily understand what action the detected person (worker W1) is taking by looking at the display contents (magnified monitoring image) of the display device 50. Furthermore, according to this example, at least part of a shovel image is included in a magnified monitoring image the same as in the first example. Therefore, it is possible to understand the relative positional relationship between a person detected by the person detecting part 301 (the worker W1) and the shovel with ease. Furthermore, according to this example, compared with a normal monitoring image, a magnified monitoring image includes a shovel image magnified with the same magnification ratio as a surrounding image the same as in the first example. Therefore, it is possible to understand the relative positional relationship between a person detected by the person detecting part 301 (the worker W1) and the shovel with more accuracy. Furthermore, according to this example, a magnified monitoring image includes the entirety of the nearby area within the predetermined distance D2 from the shovel. Therefore, the operator can understand the action of a detected person while checking the situation of the nearby area adjacent to the shovel. Therefore, it is possible to further increase safety during the operator's shovel operation.

Figure 8:
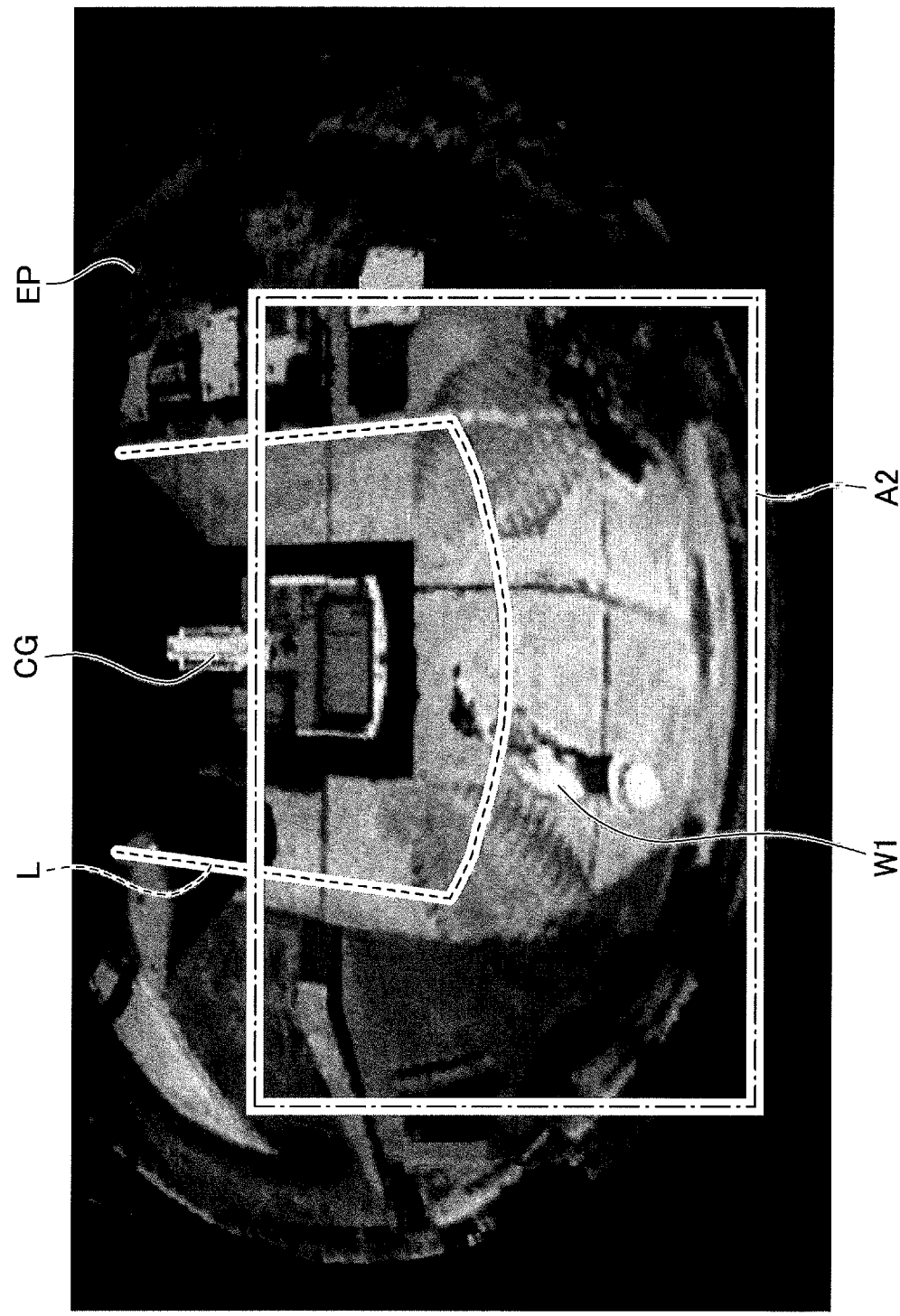
FIG. 8 is a diagram illustrating an example of a different viewpoint monitoring image displayed on the display device.

Next, FIG. 8 is a diagram illustrating an example of a different viewpoint monitoring image displayed on the display device 50. Hereinafter, a description is given based on the assumption that FIG. 8 is a different viewpoint monitoring image switched from the normal monitoring image of FIG. 4A.

In a situation where the worker W1 is shown behind the shovel (the upper turning body 3) in the surrounding image of a normal monitoring image as illustrated in FIG. 4A, the person detecting part 301 reports detection of a person to the display control part 302 in response to detecting the worker W1. In response to this, the display control part 302 changes the display mode of a monitoring image as described above.

Figure 9:
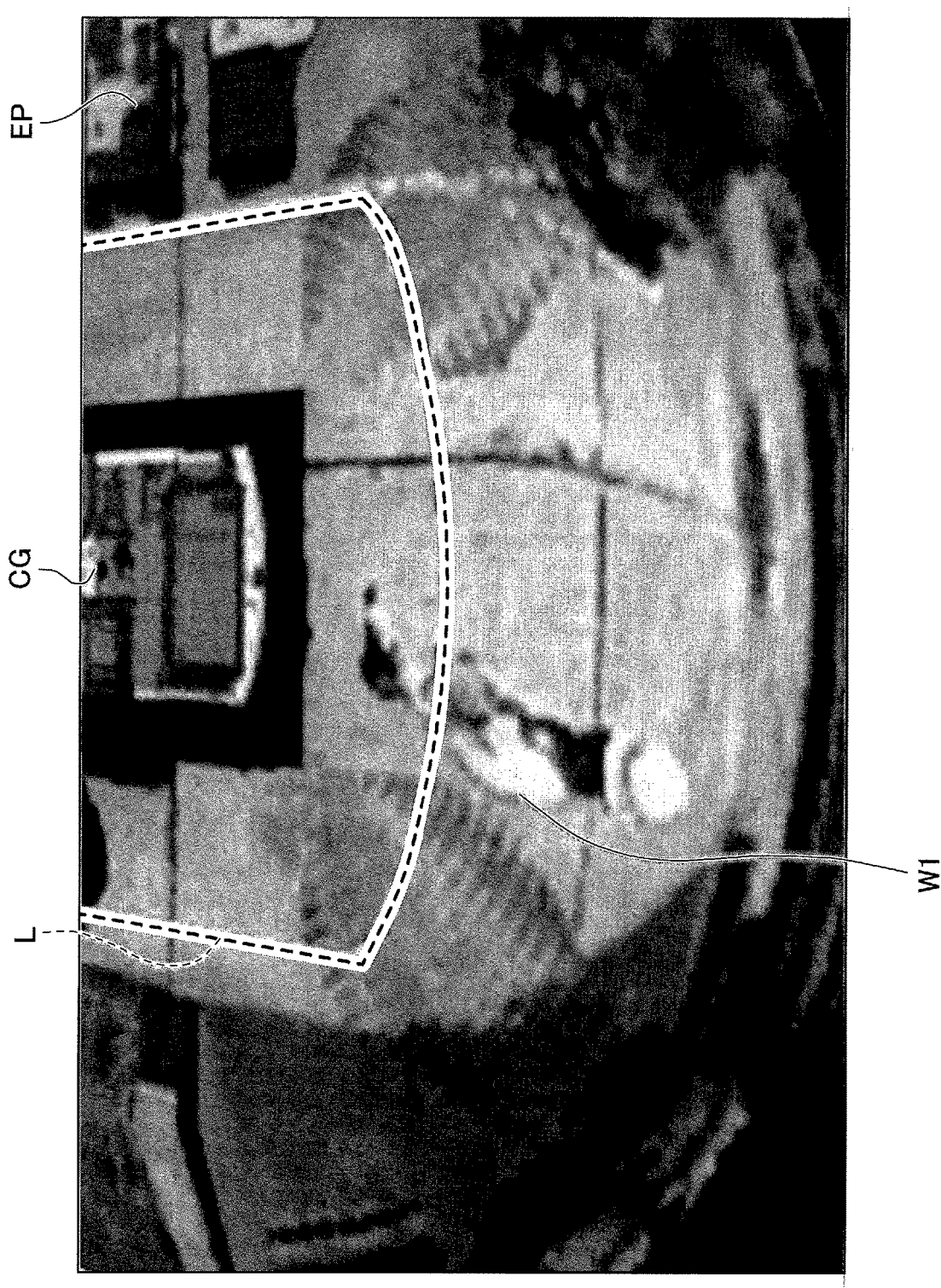
FIG. 9 is a diagram illustrating an example of a partial different viewpoint monitoring image displayed on the display device.

Specifically, as illustrated in FIG. 8, the display control part 302 generates the surrounding image EP as a viewpoint transformed image as viewed from a virtual viewpoint diagonally above the back of the shovel (in the case of this example, in an angular direction 45 degrees above from a horizontal plane behind the shovel, which also applies to FIG. 9) based on a captured image of the image capturing unit 40. Then, the display control part 302 causes a different viewpoint monitoring image including the shovel image CG viewed from the same virtual viewpoint diagonally above the back of the shovel as the surrounding image and the surrounding image EP placed along the periphery of the shovel image CG in accordance with the relative positional relationship between the shovel and the imaging range of the image capturing unit 40 to be displayed on the display device 50. As a result, the operator's view of a worker and the shovel from diagonally above the back of the shovel can be virtually produced. Therefore, it is easy for the operator to understand the positional relationship (sense of distance) between a detected person behind the shovel (the worker W1) and the shovel.

Furthermore, the display control part 302 may generate a different viewpoint monitoring image including a surrounding image as a viewpoint transformed image as viewed from a virtual viewpoint diagonally above the front of the shovel, and cause the different viewpoint monitoring image to be displayed on the display device 50. As a result, the operator's view of a detected person (the worker W1) and the shovel from diagonally above the front of the shovel can be virtually produced. Therefore, the operator has a wider field of view of an area behind the shovel including the detected person, which makes it easy for the operator to understand the situation of a worker.

That is, when the person detecting part 301 detects a person behind the shovel, the display control part 302 may generate a different viewpoint monitoring image including a surrounding image as a viewpoint transformed image as viewed from diagonally above by shifting the angular direction of a virtual viewpoint relative to a horizontal plane from a position directly above to the front or back, and cause the different viewpoint monitoring image to be displayed on the display device 50. This makes it possible for the surroundings monitoring system 100 to prompt the operator to recognize the detected person (worker W1) in the monitoring image. Specifically, by shifting the angular direction of a virtual viewpoint relative to a horizontal plane to the side on which a person is present in relation to the shovel (the back in the case of this example), the surroundings monitoring system 100 makes it easy for the operator to understand the positional relationship (sense of distance) between a worker behind the shovel and the shovel as described above. Furthermore, by shifting the angular direction of a virtual viewpoint relative to a horizontal plane to the side on which a person is present in relation to the shovel (the back in the case of this example), the surroundings monitoring system 100 widens a field of view of an area behind the shovel including a worker to make it easy for the operator to understand the situation of a detected person.

Likewise, when the person detecting part 301 detects a person to the right or left of the shovel, the display control part 302 may generate a different viewpoint monitoring image including a surrounding image as a viewpoint transformed image as viewed from diagonally above by shifting the angular direction of a virtual viewpoint relative to a horizontal plane from a position directly above to the right or left, and cause the different viewpoint monitoring image to be displayed on the display device 50. This makes it possible for the surroundings monitoring system 100 to prompt the operator to recognize a detected person (the worker W1) in the monitoring image the same as in the case where a person behind the shovel is detected.

The image capturing unit 40 may include a camera (front camera) that captures an image of an area in front of the shovel (the upper turning body 3), and the person detecting part 301 may detect a person within a predetermined area including the front of the shovel. In this case, the display control part 302 may generate a normal monitoring image including a surrounding image that is a combination of an overhead view image of a range of horizontally 360 degrees around the shovel as viewed from directly above and a horizontal image. When the person detecting part 301 detects a person in front of the shovel, the same as in the case where a person behind is detected, the display control part 302 may generate a different viewpoint monitoring image including a surrounding image as a viewpoint transformed image as viewed from diagonally above by shifting the angular direction of a virtual viewpoint relative to a horizontal plane from a position directly above to the front or back, and cause the different viewpoint monitoring image to be displayed on the display device 50. This makes it possible for the surroundings monitoring system 100 to prompt the operator to recognize a detected person (the worker W1) in the monitoring image the same as in the case where a person behind the shovel is detected. The same applies to the case of a partial different viewpoint monitoring image below.

Next, FIG. 9 is a diagram illustrating an example of a partial different viewpoint monitoring image displayed on the display device 50. Hereinafter, a description is given based on the assumption that FIG. 9 is a partial different viewpoint monitoring image switched from the normal monitoring image of FIG. 4A.

In a situation where the worker W1 is shown behind the shovel (the upper turning body 3) in the surrounding image of a normal monitoring image as illustrated in FIG. 4A, the person detecting part 301 reports detection of a person to the display control part 302 in response to detecting the worker W1. In response to this, the display control part 302 changes the display mode of a monitoring image as described above.

Specifically, as illustrated in FIG. 9, the display control part 302 generates a surrounding image as a viewpoint transformed image from a virtual viewpoint diagonally above the back of the shovel, corresponding to a partial area of a normal monitoring image including a part where the detected person is present, based on a captured image of the image capturing unit 40. Then, the display control part 302 causes a partial different viewpoint monitoring image including part of the shovel image CG viewed from the same virtual viewpoint diagonally above the back of the shovel as the surrounding image and the surrounding image EP placed along the periphery of (the part of) the shovel image CG in accordance with the relative positional relationship between the shovel and the imaging range of the image capturing unit 40 to be displayed on the display device 50. As a result, the same as in the case of a different viewpoint monitoring image, the operator's view of a worker and the shovel from diagonally above the back of the shovel can be virtually produced. Therefore, it is easy for the operator to understand the positional relationship (sense of distance) between a detected person behind the shovel (the worker W1) and the shovel. Furthermore, according to this example, only a partial area including a detected person within a normal monitoring image is displayed on the display device 50 as a partial different viewpoint monitoring image. This makes it easier for the operator to understand the situation of the detected person.

Furthermore, the display control part 302 may generate a partial different viewpoint monitoring image including a surrounding image as a viewpoint transformed image viewing a partial area of a normal monitoring image including a detected person from a virtual viewpoint diagonally above the front of the shovel, and cause the partial different viewpoint monitoring image to be displayed on the display device 50. As a result, the operator's view of a detected person (the worker W1) and the shovel from diagonally above the front of the shovel can be virtually produced the same as in the case of a different viewpoint monitoring image. Therefore, the operator has a wider field of view of an area behind the shovel including the detected person, which makes it easy for the operator to understand the situation of a worker.

That is, when the person detecting part 301 detects a person behind the shovel, the display control part 302 may generate a partial different viewpoint monitoring image including a surrounding image as a viewpoint transformed image as viewed from diagonally above by shifting the angular direction of a virtual viewpoint relative to a horizontal plane from a position directly above to the front or back, corresponding to a partial area of a normal monitoring image including a part where the detected person is present, and cause the partial different viewpoint monitoring image to be displayed on the display device 50. This makes it possible for the surroundings monitoring system 100 to further prompt the operator to recognize the detected person (worker W1) in the monitoring image.

Likewise, when the person detecting part 301 detects a person to the right or left of the shovel, the display control part 302 may generate a partial different viewpoint monitoring image including a surrounding image as a viewpoint transformed image as viewed from diagonally above by shifting the angular direction of a virtual viewpoint relative to a horizontal plane from a position directly above to the right or left, corresponding to a partial area of a normal monitoring image including a part where the detected person is present, and cause the partial different viewpoint monitoring image to be displayed on the display device 50. This makes it possible for the surroundings monitoring system 100 to further prompt the operator to recognize a detected person (the worker W1) in the monitoring image the same as in the case where a person behind the shovel is detected.

The partial different viewpoint monitoring image illustrated in FIG. 9 corresponds to the partial area A2 of the different viewpoint monitoring image of FIG. 8. Therefore, the display control part 302 may generate a different viewpoint monitoring image and thereafter generate a partial different viewpoint monitoring image by clipping and magnifying the partial area A2 of the generated different viewpoint monitoring image, based on a captured image of the image capturing unit 40.

[Details of Process of Displaying Monitoring Image]

Next, a process flow of a process of causing a monitoring image to be displayed on the display device 50 by the surroundings monitoring system 100 (the display control part 302) according to this embodiment (a display process) is described. Hereinafter, a magnified monitoring image, a different viewpoint monitoring image, and a partial different viewpoint monitoring image may be collectively referred to as "person-detecting-time monitoring image."

Figure 10:
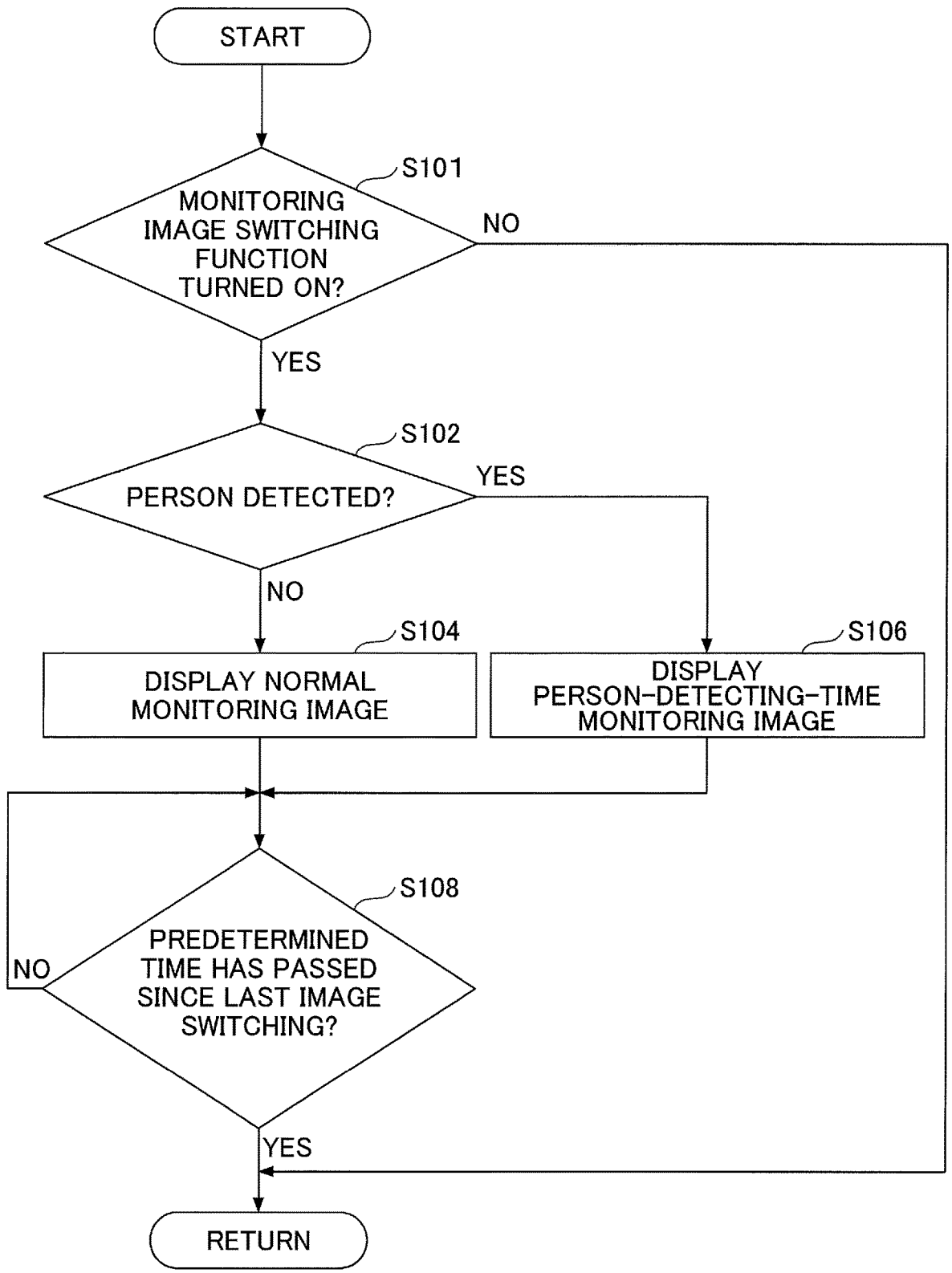
FIG. 10 is a flowchart schematically illustrating an example of a process executed by the surroundings monitoring system (a display control part).

FIG. 10 is a flowchart schematically illustrating an example of the display process executed by the surroundings monitoring system 100 (the display control part 302) according to this embodiment. For example, a process according to this flowchart is started together when the display of a normal monitoring image or a person-detecting-time monitoring image on the display device 50 is started in response to a predetermined starting operation by the operator or a predetermined start condition, and is repeatedly executed at predetermined time intervals. Furthermore, for example, a process according to this flowchart is terminated together when the display of a monitoring image (a normal monitoring image or a person-detecting-time monitoring image) on the display device 50 is terminated in response to a predetermined terminating operation by the operator or a predetermined termination condition.

At step S101, the display control part 302 determines whether the function of changing the display mode of a monitoring image in response to detection of a person is turned on. If the function is turned on, the display control part 302 proceeds to step S102. Otherwise, the display control part 302 ends a current process.

At step S102, the display control part 302 determines whether the person detecting part 301 has detected a person within a predetermined area around the shovel. If no person is detected by the person detecting part 301, the display control part 302 proceeds to step S104. If a person is detected, the display control part 302 proceeds to step S106.

At step S104, the display control part 302 causes a normal monitoring image to be displayed on the display device 50.

At step S106, the display control part 302 causes a person-detecting-time monitoring image to be displayed on the display device 50.

The display control part 302 may be able to display one person-detecting-time monitoring image selected in response to a preliminary selecting operation by the operator or the like from two or more person-detecting-time monitoring images among a magnified monitoring image, a different viewpoint monitoring image, and a partial different viewpoint monitoring image by the processing of this step. Alternatively, the display control part 302 may be able to display only one person-detecting-time monitoring image among a magnified monitoring image, a different viewpoint monitoring image, and a partial different viewpoint monitoring image on the display device 50 by the processing of this step.

At step S108, the display control part 302 determines whether a predetermined time has passed since the last switching of images (switching an image from a normal monitoring image to a person-detecting-time monitoring image or switching an image from a person-detecting-time monitoring image to a normal monitoring image) on the display device 50. If a predetermined time has not passed since the last switching of images on the display device 50, the display control part 302 repeats the processing of this step. If a predetermined time has passed since the last switching of screens (or no screen switching has occurred after the start of a process according to this flowchart), the display control part 302 returns to step S102 to repeat a process according to this flowchart. This makes it possible to prevent the occurrence of hunting that is a frequent switching of screen contents between a normal monitoring image and a magnified monitoring image or the like that occurs when, for example, a person is positioned at the boundary of a predetermined area around the shovel (an area within the predetermined distance D1 from the shovel).

[Effects]

Thus, according to this embodiment, when the person detecting part 301 detects a person within a predetermined area, the display control part 302 causes a magnified monitoring image magnifying a partial area of a surrounding image in a normal monitoring image, centered on a position closer to a detected person included in the surrounding image than to a shovel image and including the person, to be displayed on the display device 50. As a result, when the person detecting part 301 detects a person around the shovel, a magnified monitoring image in which a part including the detected person is placed closer to the center is displayed on the display device 50. Therefore, the operator can easily check the detected person displayed closer to the center of the screen of the display device 50 and easily understand the condition of the detected person, such as the details of action. Accordingly, the surroundings monitoring system 100 can further increase safety during the operator's shovel operation.

Furthermore, according to this embodiment, when the person detecting part 301 detects a person within a predetermined area, the display control part 302 generates a different viewpoint monitoring image including a surrounding image as a viewpoint transformed image as viewed from diagonally above by shifting the angular direction of a virtual viewpoint relative to a horizontal plane from a position directly above to a direction toward or a direction away from the detected person relative to the shovel, and causes the different viewpoint monitoring image to be displayed on the display device 50. This makes it possible for the surroundings monitoring system 100 to prompt the operator to recognize the detected person in the monitoring image as described above. Accordingly, the surroundings monitoring system 100 can further increase safety during the operator's shovel operation.

Furthermore, according to this embodiment, when the person detecting part 301 detects a person within a predetermined area, the display control part 302 generates a partial different viewpoint monitoring image including a surrounding image as a viewpoint transformed image as viewed from diagonally above by shifting the angular direction of a virtual viewpoint relative to a horizontal plane from a position directly above to a direction toward or a direction away from the detected person relative to the shovel, corresponding to a partial area of a normal monitoring image including a part where the detected person is present, and causes the partial different viewpoint monitoring image to be displayed on the display device 50. This makes it possible for the surroundings monitoring system 100 to further prompt the operator to recognize the detected person in the monitoring image as described above. Accordingly, the surroundings monitoring system 100 can further increase safety during the operator's shovel operation.

As another configuration of changing the specifications of the change of the display mode of a monitoring image in accordance with the distance D between a detected person and the shovel as described above, the display control part 302 may change the center of a partial area of a normal monitoring image including a person to be magnified and displayed as a magnified monitoring image. For example, when the distance D between a person and the shovel is relatively small (for example, the distance D is less than or equal to the predetermined distance D2), the display control part 302 causes a magnified monitoring image magnifying a partial area of a surrounding image in a normal monitoring image, centered on a position closer to the person included in the surrounding image than to a shovel image and including the person, to be displayed on the display device 50. On the other hand, when the distance D between a person and the shovel is relatively large (for example, the distance D is not less than or equal to the predetermined distance D2), the display control part 302 causes a magnified monitoring image magnifying a partial area including the person, centered on the shovel image in a normal monitoring image, to be displayed on the display device 50. As a result, when the detected person is relatively close to the shovel, the operator can easily understand the condition of the detected person and can reliably secure the safety of the detected person. On the other hand, when the detected person is relatively remote from the shovel, the operator can understand the condition of the detected person while understanding the condition of the entirety of the surroundings of the shovel, and thus can take subsequent safety actions with ease.

Furthermore, according to this embodiment, a magnified monitoring image magnifying a shovel image as well in accordance with a partial area of a surrounding image is generated, while a magnified monitoring image that magnifies only a partial area of a surrounding image and does not magnify a shovel image may also be generated.

Furthermore, according to this embodiment, a magnified monitoring image including at least part of a shovel image is generated, while a magnified monitoring image excluding a shovel image may also be generated, for example.

An embodiment of the present invention is described in detail above. The present invention, however, is not limited to the specific embodiment, and allows variations and modifications within the scope of the present invention described in the claims.

For example, according to the above-described embodiment, a magnified monitoring image, a different viewpoint monitoring image, and a partial different viewpoint monitoring image are illustrated as examples of display mode that stresses (emphasizes) the position of a detected person compared with other positions within a monitoring image, while the display mode is not limited to these. For example, when the person detecting part 301 detects a person within a predetermined area around the shovel, the display control part 302 may generate a monitoring image by placing a captured image (a through-the-lens image) showing the detected person among the respective captured images of the back camera 40B, the left side camera 40L, and the right side camera 40R directly over an area of a normal monitoring image where the detected person is not included, and cause the monitoring image to be displayed on the display device 50. As a result, an area including the person in the normal monitoring image is emphasized. Therefore, the operator can easily understand the situation of the detected person and can simultaneously view a through-the-lens image showing the detected person, so that it is easier for the operator to understand the situation of the detected person.

Furthermore, for example, the controller 30 (the surroundings monitoring system 100), which detects a person as a monitoring target according to the above-described embodiment, may also detect objects including or other than a person (such as other work machines, vehicles, and temporarily placed materials around the shovel). In this case, the controller 30 (the surroundings monitoring system 100) changes the display mode of a monitoring image the same as described above in accordance with the presence or absence of detection of an object that is a monitoring target.

What is claimed is:

1. A surroundings monitoring system for a work machine, comprising:
   a display device provided in a cabin of the work machine;
   an image capturing unit configured to capture an image of surroundings of the work machine; and
   a processor configured to generate a surrounding image of the work machine based on the captured image of the image capturing unit and to cause a monitoring image to be displayed on the display device, the monitoring image including an image of the work machine schematically representing the work machine and the surrounding image, the surrounding image being placed along a periphery of the image of the work machine in accordance with a relative positional relationship between the work machine and an imaging range of the image capturing unit,
   wherein the processor is configured to generate a magnified monitoring image by magnifying a partial area of the surrounding image in the monitoring image, the partial area including an image of a predetermined target object included in the surrounding image,
   the processor is configured to cause the magnified monitoring image to be displayed on the display device, and
   the image of the work machine includes an image of an upper turning body of the work machine, and the processor is configured to generate the magnified monitoring image by magnifying the partial area of the surrounding image such that the magnified monitoring image includes the image of the target object and at least part of the image of the upper turning body included in the image of the work machine.

2. The surroundings monitoring system as claimed in claim 1, wherein
   the processor is configured to detect the target object within a predetermined area around the work machine, and
   the processor is configured to, when detecting the target object within the predetermined area, cause the magnified monitoring image to be displayed on the display device.

3. The surroundings monitoring system as claimed in claim 1, wherein the processor is configured to cause the magnified monitoring image to be displayed on the display device, the magnified monitoring image magnifying the image of the work machine in accordance with the partial area.

4. The surroundings monitoring system as claimed in claim 1, wherein the processor is configured to cause the magnified monitoring image to be displayed on the display device, the magnified monitoring image magnifying the partial area centered on a position of the target object included in the surrounding image.

5. The surroundings monitoring system as claimed in claim 1, wherein the processor is configured to cause the magnified monitoring image to be displayed on the display device, the magnified monitoring image magnifying the partial area centered on a position closer to a position of a substantial centroid of a figure defined by positions of a plurality of target objects included in the surrounding image than to the image of the work machine and including the plurality of target objects.

6. The surroundings monitoring system as claimed in claim 1, wherein the processor is configured to cause the magnified monitoring image to be displayed on the display device, the magnified monitoring image magnifying the partial area centered on a position of one of a plurality of target objects included in the surrounding image which one is closest to the work machine.

7. The surroundings monitoring system as claimed in claim 1, wherein the processor is configured to change a magnification ratio of the magnified monitoring image in accordance with a distance between the work machine and the target object.

8. The surroundings monitoring system as claimed in claim 1, wherein a function of the processor to cause the magnified monitoring image to be displayed on the display device is configured to be switched between an enabled state and a disabled state.

9. The surroundings monitoring system as claimed in claim 1, wherein the processor is configured to cause the monitoring image including the surrounding image as viewed from a predetermined viewpoint to be displayed on the display device, and to cause an image corresponding to the partial area as viewed from the predetermined viewpoint, an image corresponding to the partial area as viewed from a viewpoint different from the predetermined viewpoint, or the captured image of the image capturing unit corresponding to the partial area to be displayed on the display device as the magnified monitoring image.

10. The surroundings monitoring system as claimed in claim 1, wherein the processor is configured to cause the monitoring image including, as the surrounding image, an overhead view image as viewed from a viewpoint above the work machine to be displayed on the display device, and to cause the magnified monitoring image to be displayed on the display device by moving a center of the monitoring image in at least one of a vertical direction and a lateral direction of a display area of the display device and magnifying the monitoring image.

11. The surroundings monitoring system as claimed in claim 1, wherein the processor is configured to cause the magnified monitoring image to be displayed on the display device, the magnified monitoring image magnifying the partial area at a magnification ratio set by an operation input from a user, the partial area being centered on a position set by an operation input from the user and including the target object.

12. The surroundings monitoring system as claimed in claim 1, wherein the processor is configured to switch the monitoring image to the magnified monitoring image in a first mode or a second mode, the first mode being higher in sequentiality than the second mode.

13. The surroundings monitoring system as claimed in claim 1, wherein the processor is configured to cause the magnified monitoring image to be displayed on the display device in response to detection of the target object within a predetermined area around the work machine.

14. The surroundings monitoring system as claimed in claim 1, wherein the partial area is centered on a position closer to the target object than to the image of the work machine.

* * * * *